US012681286B2

(12) United States Patent
Zantl

(10) Patent No.: US 12,681,286 B2
(45) Date of Patent: Jul. 14, 2026

(54) SAMPLE CHAMBER FOR MICROSCOPING CELLS AND SYSTEM WITH A SAMPLE HOLDER AND A SAMPLE CHAMBER

(71) Applicant: ibidi GmbH, Gräfelfing (DE)

(72) Inventor: Roman Zantl, Gräfelfing (DE)

(73) Assignee: ibidi GmbH, Gräfelfing (DE)

( * ) Notice: Subject to any disclaimer, the term of this patent is extended or adjusted under 35 U.S.C. 154(b) by 735 days.

(21) Appl. No.: 17/647,858

(22) Filed: Jan. 13, 2022

(65) Prior Publication Data

US 2022/0221704 A1     Jul. 14, 2022

(30) Foreign Application Priority Data

Jan. 14, 2021    (EP) ..................................... 21151605

(51) Int. Cl.
*G02B 21/26* (2006.01)
*G02B 21/34* (2006.01)

(52) U.S. Cl.
CPC ............. *G02B 21/26* (2013.01); *G02B 21/34* (2013.01)

(58) Field of Classification Search
CPC ........... G02B 21/26; G02B 21/34; B01L 9/52; B01L 2200/0647; B01L 2200/0689; B01L 2300/0822
USPC ....................................................... 359/391
See application file for complete search history.

(56) References Cited

U.S. PATENT DOCUMENTS

| | | | |
|---|---|---|---|
| 2,940,360 A | 6/1960 | Carter, Jr. | |
| 3,475,102 A | 10/1969 | Larsen | |
| 5,795,748 A | 8/1998 | Cottingham | |
| 6,037,168 A * | 3/2000 | Brown ................ B01L 3/50853 | |
| | | | 435/305.3 |
| 6,261,523 B1 | 7/2001 | Schembri | |
| 2003/0109059 A1* | 6/2003 | Adrien ................... G02B 21/34 | |
| | | | 422/400 |
| 2005/0270642 A1* | 12/2005 | McLellan .............. G02B 21/34 | |
| | | | 359/391 |
| 2007/0054327 A1 | 3/2007 | Iseri | |

(Continued)

FOREIGN PATENT DOCUMENTS

CN          109975969 A      7/2019

OTHER PUBLICATIONS

Extended European Search Report, European Patent Application No. 21151605.9, Jun. 24, 2021.

*Primary Examiner* — Thomas K Pham
*Assistant Examiner* — Justin W. Hustoft
(74) *Attorney, Agent, or Firm* — Lowenstein Sandler LLP

(57)          ABSTRACT

The invention relates to a sample chamber for microscoping cells, comprising a cover plate, the underside of which comprises a bearing area. A reservoir for the cells with a reservoir base can be formed in the cover plate and the underside of the cover plate can comprise a reservoir base area which is arranged offset downwardly with respect to the bearing area. Alternatively, the sample chamber can comprise a base plate and the underside of the cover plate can comprise a fastening area which is arranged offset downwardly with respect to the bearing area and to which the base plate is fastened, wherein the cover plate and the base plate are configured and arranged such that they together form a reservoir for the cells with a reservoir base, wherein the base (Continued)

plate forms the reservoir base. The invention also relates to a system with a sample holder and a sample chamber.

17 Claims, 18 Drawing Sheets

(56)　　　　　　References Cited

U.S. PATENT DOCUMENTS

2012/0133757 A1 *　5/2012　Thomas ................. G02B 21/26
　　　　　　　　　　　　　　　　　　　348/80

* cited by examiner

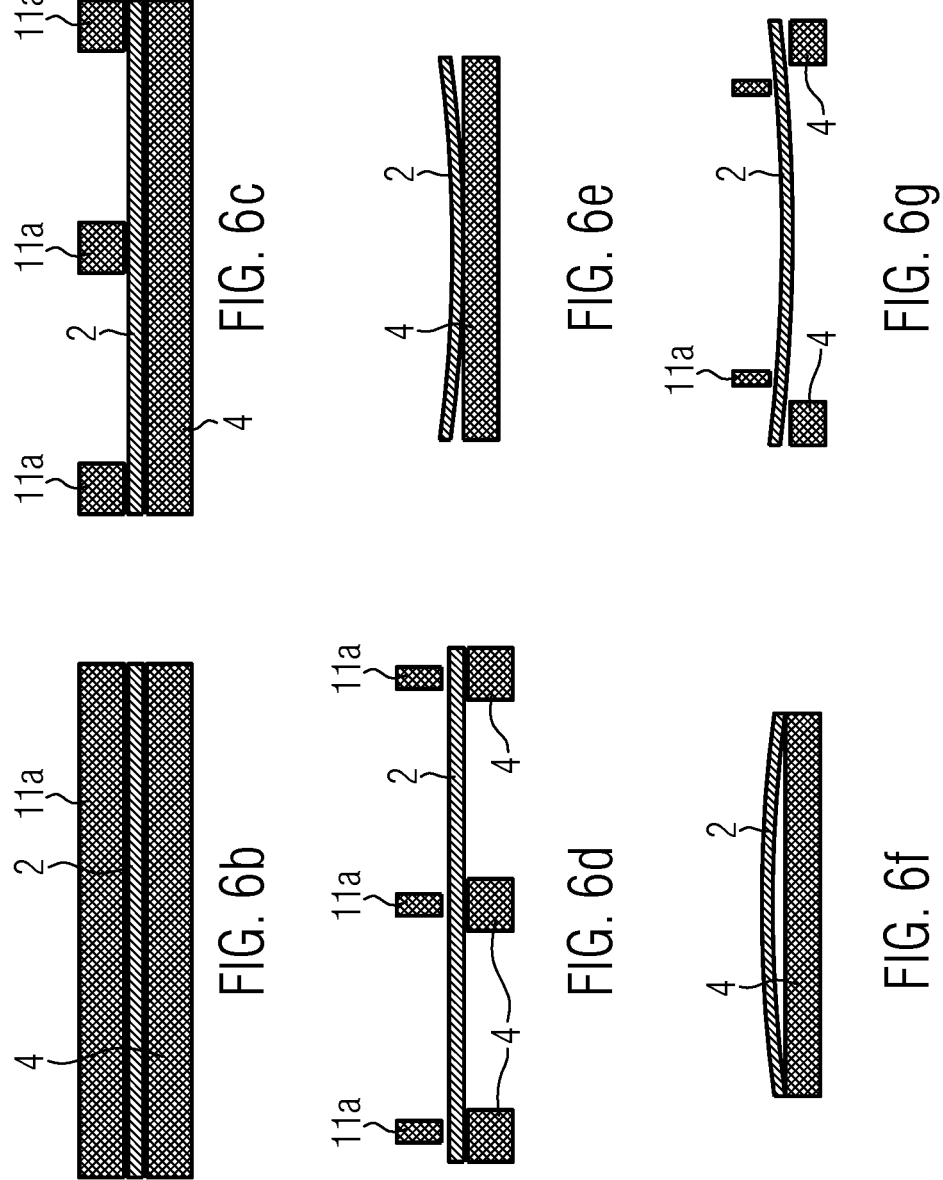

SAMPLE CHAMBER FOR MICROSCOPING CELLS AND SYSTEM WITH A SAMPLE HOLDER AND A SAMPLE CHAMBER

CROSS REFERENCE TO RELATED APPLICATIONS

The present application claims priority to European Patent Application No. 21151605.9, filed Jan. 14, 2021, which is incorporated herein by reference in its entirety.

The invention relates to a sample chamber for microscoping cells, comprising a cover plate, wherein a reservoir for the cells is formed in the cover plate, or in addition to the cover plate comprising a base plate which is fastened to the underside of the cover plate, wherein the cover plate and the base plate are configured and arranged such that they together form a reservoir for the cells, wherein the base plate forms the reservoir base.

Such sample chambers are used for microscoping by way of inverse microscopy in which the objective is directed from below onto the sample chamber. The examination then takes place through the reservoir base, in particular, through the base plate or the region of the cover plate above a reservoir base area, respectively. The base plate of the sample chamber can be, for example, a cover glass base.

Inverse microscopy systems typically comprise a sample holder on which the sample chamber rests during microscopy. Such a sample holder comprises a bearing plate and a microscopy opening in the bearing plate. During microscopy, part of the sample chamber, typically the outer edge of the sample chamber, rests on the bearing plate. The region arranged above the microscopy opening is the region of the sample chamber to be microscoped. This is where the reservoir with the cells is disposed. The cells in the reservoir can then be examined from below through the microscopy opening.

In many cases, the sample chamber is then standing with the base plate, for example, the cover glass base, or with the reservoir base area on the sample holder. In other cases, the base plate or the reservoir base area, respectively, is arranged offset upwardly in comparison to the bearing area of the cover plate so that the sample chamber does not stand with the base plate or the reservoir base area on the sample holder.

When microscoping the cell cultures, it is basically advantageous to be able to move the objective, in particular, its front lens, as close as possible to the base of the sample chamber. However, there is a risk that the objective strikes the boundary of the microscopy opening if it projects at least in part into the microscopy opening and is then moved to the side. In addition, the lateral boundary of the microscopy opening represents a limitation with regard to the area that can be imaged with high quality because the front lens cannot be moved at a correspondingly small distance all the way to the edge of the region of the sample chamber to be examined. Therefore, all known systems have the problem that the area that can be microscoped is limited by the geometry that is inherent to the system, when taking safety considerations into account.

It is an object of the invention to provide a sample chamber and a system comprising a sample chamber and a sample holder, each of which makes it possible to provide a large area that can be microscoped and safety at the same time.

The invention provides a sample chamber for microscoping cells. The sample chamber comprises a cover plate, the underside of which has a bearing area.

A reservoir for the cells with a reservoir base can be formed in the cover plate and the underside of the cover plate can comprise a reservoir base area which is arranged offset downwardly with respect to the bearing area. The sample chamber can be formed, in particular, integrally. The reservoir base area is an area on the underside of the part of the cover plate that forms the reservoir base. In other words, the reservoir base area is an area on the underside of the cover plate which is arranged below the reservoir.

Alternatively, the sample chamber can comprise a base plate, wherein the cover plate and the base plate are configured and arranged such that they together form a reservoir for the cells with a reservoir base, wherein the base plate forms the reservoir base and wherein the underside of the cover plate comprises a fastening area which is arranged offset downwardly with respect to the bearing area and to which the base plate is fastened. The sample chamber is then configured to be multi-part.

The offset of the fastening area or the reservoir base area, respectively, with respect to the bearing area in both cases leads to the underside of the base plate or the reservoir base area, respectively, for the intended use of the sample chamber during which the sample chamber rests on a sample holder, in particular, on a bearing plate of the sample holder with a microscopy opening, being arranged farther downwardly in comparison to the known sample chambers so that the objective moves closer to the base plate or the reservoir base area, respectively, and a larger region of the sample chamber can be imaged, thus increasing the area that can be microscoped without increasing the risk of the objective being damaged.

The sample chamber according to the invention thus satisfies the above-mentioned problem.

The upper side of the sample chamber, the cover plate, and the base plate are each the side that faces upwardly during intended use, i.e. when the sample chamber rests as intended on the sample holder. The underside of the sample chamber, the cover plate, and the base plate are each the side that faces downwardly during intended use, i.e. when the sample chamber rests as intended on the sample holder. The terms "offset upwardly", "offset downwardly", "above" and "below" also always refer to the arrangement for the intended use.

In the alternative, in which the base plate fastened to the cover plate forms the reservoir base, the cover plate can be configured such that its underside comprises an opening, and the base plate can then be fastened to the cover plate such that it closes the opening and forms the base of the sample chamber below the opening. The fastening area can directly border the opening.

The cover plate and the base plate can together form one or more reservoirs that are separated by walls that can be formed, for example, in the cover plate.

Alternatively, one or more reservoirs can be formed in the cover plate and be separated by walls which can be formed, for example, in the cover plate. The cover plate can therefore form at least the lateral boundary of the reservoir or reservoirs and the base of the reservoir or reservoirs. In other words, the cover plate can define the reservoir or reservoirs laterally and downwardly. The cover plate can form, in particular, the entire base of the sample chamber. The cover plate can be, in particular, completely closed towards the bottom. In the case of several reservoirs, the cover plate can have the same thickness wherever it forms the base of the reservoirs, in particular, in the entire region of the reservoir base area.

The distance by which the fastening area is offset downwardly with respect to the bearing area can be between 0.2 mm and 5 mm, in particular, between 0.2 mm and 1.5 mm, in particular, between 0.2 mm and 1 mm, in particular, between 0, 2 mm and 0.5 mm. In the case of a step structure mentioned above and described in detail below, this distance is also referred to as the step height of the step structure.

The bearing area and/or the fastening area of the sample chamber can be formed to be planar and, in particular, parallel to one another. When used as intended, the bearing area and/or the fastening area can be arranged to be horizontal.

The bearing area and/or the reservoir base area of the sample chamber can be formed to be planar and, in particular, parallel to one another. When used as intended, the bearing area and/or the fastening area can be arranged to be horizontal. The cover plate can be made of plastic material, in particular, in the form of an injection-molded member.

The base plate can be configured in the form of a cover glass base. The base plate can be formed to be multi-part, wherein each part of the base plate can define one or more respective reservoirs towards the bottom. The parts of the base plate are all of the same thickness and fastened to a partial area of the fastening area.

The base plate or the cover plate, respectively, in the region of the reservoir base area can be parallel at least in part to the bearing area of the sample chamber, in particular, in the region to be microscoped. When used as intended, the bearing area can be arranged to be horizontal.

The base plate or the cover plate, respectively, can be made of plastic material in the region of the reservoir base area, for example, of COC, COP, PMMA, PS, PC, or of glass, for example, borosilicate, $SiO_2$.

The sample chamber can be configured for single use. It can therefore be a consumable product.

The sample chamber can be configured in the form of an, in particular, multi-part, Petri dish or a carrier in the object slide format with structures or in the form of an, in particular, multi-part, multi-tier plate.

The sample chamber can comprise a Petri dish, wherein the base plate is configured, for example, as a cover glass base, wherein the cover plate can be configured, in particular, in the form of an injection-molded member, onto the underside of which a base plate in the form of a cover glass base is fastened. Alternatively, the cover plate can form the entire Petri dish including the base of the Petri dish, the sample chamber can therefore be configured as an integrally formed Petri dish.

The sample chamber can be configured in the form of a microscopy carrier with one or more reservoirs, for example, beakers and/or channels, which are defined either laterally and below by the cover plate or laterally by the cover plate and below by a single-part or multi-part base plate, for example, a cover glass base, which is fastened to the underside of the cover plate. If a multi-part base plate is provided, then each part of the base plate covers only some of the reservoirs, in other words, not all of the reservoirs. In this context, the cover plate is also referred to as a carrier plate.

If the sample chamber is configured in the form of a microscopy carrier, then the cover plate can have a width and a length, in particular, also a thickness, according to the values of the DIN ISO 8037-1 standard for microscopy carriers. Alternatively, the width and/or length and/or the width can also be below the values of this DIN standard, in particular, respectively by up to 10%, in particular, by up to 5%, in particular, by up to 2%. For example, the length can be less than or equal to 76 mm and the width less than or equal to 26 mm. The maximum thickness can be between 1 mm and 5 mm, in particular, 1 mm and 1.5 mm.

Alternatively, the dimensions of the sample chamber, in particular, the cover plate, can correspond to the ANSI standard of the Society for Biomolecular Screening (SBS) for multititer plates. In the case of multi-titer plates, a common base plate typically covers all reservoirs.

The bearing area can be arranged between the fastening area or the reservoir base area, respectively, and the outer edge or the outer edges of the underside of the cover plate. Alternatively, the bearing area can be arranged between the reservoir base area and the outer edge or the outer edges of the underside of the cover plate.

This means that the bearing area can be arranged farther outwardly than the fastening area or the reservoir base area, respectively.

In particular, the bearing area can form at least part of the outer edge of the underside of the cover plate. If the bearing area forms only part of the outer edge, then the sample chamber does not rest with the entire edge of the underside on a sample holder in the properly installed state. The bearing area can also form, in particular, the entire edge of the underside of the cover plate. In the properly installed state, the sample chamber then rests with the entire edge of the underside on a sample holder.

The bearing area forming at least part of the outer edge of the underside means that it directly borders at least one of the lower outer edges of the cover plate. If the bearing area forms the entire edge, this means that all of the lower outer edges directly border the bearing area entirely. If the bearing area does not directly border at least part of a lower outer edge, then the bearing area forms at most part of the outer edge.

If the bearing area forms the entire outer edge, then it can form a closure with the sample holder when used as intended, i.e. when the bearing area rests on the sample holder, in particular, form a seal between the space above the cover plate and the space below the cover plate, in particular, the objective space. If the sample chamber is gas-flushed from above, then gas entry into the objective space can then be reduced.

The underside of the cover plate can have at least one step structure formed by the bearing area and the reservoir base area or by the bearing area and the fastening area.

The bearing area can alternatively or additionally be arranged in a first plane, which is arranged horizontally during intended use, and the reservoir base area or the fastening area can be arranged in a second plane, which is arranged horizontally during intended use. Between the bearing area and the reservoir base area or between the bearing area and the fastening area, the underside of the cover plate can have an area which is arranged in a third plane which is arranged horizontally during intended use and which is offset upwardly with respect to the bearing area. In particular, in the top view onto the sample chamber, this area can entirely surround the reservoir base area or the fastening area, respectively, so that the reservoir base area or the fastening area does not border the bearing area. In this case, the bearing area does not form a step structure with the reservoir base area or fastening area, respectively.

The bearing area can be configured in the form of a continuous area. For example, it can then form the entire, in particular, the outer, edge of the underside of the cover plate.

Alternatively, the bearing area can comprise several partial areas separated from one another by separating elements, wherein the separating elements can be configured, in particular, in the form of a standing element that extends downwardly from the bearing area, or in the form of a discontinuation. This can be, for example, the standing elements described below. If the bearing area comprises several partial areas, then all partial areas can be arranged parallel to one another and at the same height.

In particular, the bearing area can comprise the partial areas separated from one another and be configured in the form of an area that is arranged circumferentially around the fastening area and that is subdivided into the separate partial areas by at least two, in particular, at least three, separating elements in the form of discontinuations and/or in the form of standing elements. For example, the bearing area can then form part of the outer edge of the underside of the cover plate.

The advantage of the discontinuations described above is that, where no bearing area is provided, i.e. in the region of the discontinuations, additional space is created where the or a reservoir can be arranged.

The bearing area can comprise a first partial area and a second partial area which are arranged to be separate from one another and on oppositely disposed sides of the underside of the cover plate.

In particular, the underside of the cover plate can be formed to be rectangular, i.e., have a rectangular base area, and the first partial area and the second partial area are each arranged on one of the long sides or each on one of the short sides of the underside of the cover plate. This means that the first partial area can be arranged on a first long side and the second partial area can be arranged on the second long side opposite this first long side. Alternatively, the first partial area can be arranged on a first short side and the second partial area can be arranged on the second short side opposite this first short side. Alternatively, the cover plate can have a circular base area and the two partial areas can be arranged to be disposed opposite one another, i.e., for example, on the circumference of the circle and on a common line through the center point. In all these cases, the partial areas are therefore arranged on oppositely disposed sides of the underside of the cover plate.

In addition to a first and a second partial area, the bearing area can comprise a third partial area and/or a fourth partial area which are arranged to be separate from one another and from the first partial area and the second partial area.

In particular, the underside of the cover plate can be formed to be rectangular, the first partial area and the second partial area can each be arranged on one of the long sides and the third partial area and/or the fourth partial area can each be arranged on one of the short sides of the underside of the cover plate.

This means that one partial area each can be arranged on the two long sides and on one or both of the short sides. Alternatively, one partial area each can also be arranged on both short sides and only on one of the two long sides.

The bearing area can consist of a plurality of, in particular, at least three, partial areas which are arranged to be separate from one another and, in particular, evenly spaced along the outer side of the underside of the cover plate.

In particular, the underside of the cover plate can be configured to be round and the partial areas can be arranged, in particular, evenly spaced along the circumference of the underside of the cover plate.

The cover plate can have at least two, in particular, at least three, in particular, at least four, standing elements which extend downwardly from the bearing area, wherein the standing elements each comprise a standing area which is arranged offset downwardly with respect to the bearing area, is arranged, in particular, offset downwardly with respect to the reservoir base area, or with respect to the underside of the base plate. All standing elements can have the same height. This means that the downwardly offset of all standing areas with respect to the bearing area can be the same.

The separating elements described above can be configured as such standing elements. However, the standing elements do not have to be configured and arranged such that partial areas of the bearing area are thereby separated from one another.

In the top view onto the sample chamber, the standing elements can be arranged spaced from the fastening area or the reservoir base area, respectively.

In particular, in the top view onto the sample chamber, part of the bearing area can be arranged between the standing elements and the reservoir base area or the fastening area, respectively. Alternatively or additionally, in the top view onto the sample chamber, the above-mentioned area, which is arranged between the bearing area and the reservoir base area or the fastening area, respectively, and is offset upwardly with respect to the bearing area, can be arranged between the standing elements and the reservoir base area or the fastening area, respectively. The upper side of the cover plate can comprise a press-on area that is disposed entirely or in part opposite to the bearing area, wherein the thickness of the cover plate in the region of the press-on area is smaller than the maximum thickness of the cover plate so that the upper side of the cover plate has a step structure.

The press-on area can form, in particular, at least part of the outer edge of the upper side of the cover plate. The press-on area can also form, in particular, the entire outer edge of the upper side of the cover plate.

The press-on area can be formed to be planar, in particular, parallel to the bearing area.

The press-on area being arranged entirely or in part opposite the bearing area means that the two areas at least overlap one another, in particular, are configured and arranged congruently.

The press-on area forming at least part of the outer edge of the upper side means that it directly borders at least one of the upper outer edges of the cover plate. If the press-on area forms the entire edge, this means that all the upper outer edges directly border the press-on area entirely. If at least part of an upper outer edge does not directly border the press-on area, then the press-on area forms at most part of the outer edge.

The press-on area can be configured in the form of a continuous area. For example, it can then form the entire edge of the upper side of the cover plate.

Alternatively, the press-on area can comprise several partial areas that are separate from one another. In particular, the press-on area can be configured in the form of an area which is arranged circumferentially around the upper side of the cover plate and which is subdivided into the separate partial areas by at least two, in particular, at least three discontinuations.

With regard to the meaning of a continuous area, of separate partial areas, and of discontinuations, reference is made to the explanations in the context of the bearing area which can be applied analogously.

The press-on area can comprise a first partial area and a second partial area which are arranged to be separate from one another and on oppositely disposed sides of the upper side of the cover plate. In particular, the upper side of the cover plate can be formed to be rectangular, the first partial area and the second partial area can each be arranged on one of the long sides and or each on one of the short sides of the upper side of the cover plate.

This means that the first partial area of the press-on area can be arranged on a first long side and the second partial area of the press-on area can be arranged on the second long side disposed opposite this first long side. Alternatively, the first partial area can be arranged on a first short side and the second partial area can be arranged on the second short side disposed opposite this first short side.

Alternatively, the cover plate can have a circular base area and the two partial areas can be arranged to be disposed opposite one another, i.e., for example, on the circumference of the circle and on a common line through the center point.

In addition to the first and the second partial area, the press-on area can comprise a third partial area and/or a fourth partial area which are arranged to be separate from one another and from the first partial area and the second partial area. In particular, the upper side of the cover plate can be formed to be rectangular, the first partial area and the second partial area can each be arranged on one of the long sides and the third partial area and/or the fourth partial area each on one of the short sides of the upper side of the cover plate.

This means that one partial area each can be arranged on the two long sides and on one or both of the short sides. Alternatively, one partial area each can also be arranged on both short sides and only on one of the two long sides.

The press-on area can consist of a plurality of, in particular, at least three, partial areas which are arranged to be separate from one another and, in particular, evenly spaced along the outer side of the upper side of the cover plate. In particular, the upper side of the cover plate can be configured to be round and the partial areas can be arranged, in particular, evenly spaced along the circumference of the upper side of the cover plate.

In particular, the partial areas of the press-on area can be congruent with the partial areas of the bearing area of the sample chamber.

The invention also relates to a system comprising a sample holder which comprises a bearing plate with a microscopy opening, and a sample chamber for microscoping cells. The sample chamber comprises a cover plate, the underside of which comprises a bearing area. A reservoir for the cells with a reservoir base can be formed in the cover plate, the underside of the cover plate can comprise a reservoir base area, and the sample chamber and the sample holder can be configured such that, when the sample chamber aligns as intended on the sample holder, the reservoir base area is arranged offset downwardly with respect to the underside of the bearing plate or the reservoir base area is received in the microscopy opening, in particular, such that the reservoir base area is flush with an underside of the bearing plate. Alternatively, the sample chamber can comprise a base plate, wherein the cover plate and the base plate are configured and arranged such that they together form a reservoir for the cells with a reservoir base, wherein the base plate forms the reservoir base and wherein the underside of the cover plate comprises a fastening area on which the base plate is fastened.

The sample chamber and the sample holder can then be configured such that, when the sample chamber is arranged as intended on the sample holder, the underside of the base plate is arranged offset downwardly with respect to the underside of the bearing plate or the base plate is received in the microscopy opening, in particular, such that the underside of the base plate aligns with an underside of the bearing plate.

In particular, the sample chamber can be one of the sample chambers described above in which the underside of the cover plate comprises a bearing area and a fastening area to which the base plate is fastened, and the fastening area is arranged offset downwardly with respect to the bearing area, in particular, such that the underside of the cover plate has a step structure.

Alternatively, the sample chamber can be one of the sample chambers described above in which the underside of the cover plate comprises a bearing area and a reservoir base area, and the reservoir base area is arranged offset downwardly with respect to the bearing area, in particular, such that the underside of the cover plate has a step structure.

Due to the structure described above, the sample chamber does not rest with the base plate or the reservoir base area, respectively, on the sample holder when arranged as intended.

When it is presently described that something, for example, the underside of the base plate or the fastening area or the reservoir base area, aligns with the underside of the bearing plate, then this means that it is aligned with the region of the underside of the bearing plate bordering the microscopy opening.

The system can be configured such that the region of the sample chamber to be microscoped and arranged as intended is arranged above the microscopy opening. In this way, the cells can be examined from below through the microscopy opening.

The upper side of the bearing plate can comprise a bearing region on which the sample chamber, in particular, the bearing area of the cover plate rests when the sample chamber is arranged as intended on the sample holder.

The sample holder can be configured, in particular, such that the upper side of the bearing plate comprises a bearing region which is offset downwardly in relation to other regions of the upper side of the bearing plate and on which the sample chamber, in particular, the bearing area of the cover plate rests when the sample chamber is arranged as intended on the sample holder so that the upper side of the bearing plate has a step structure. In particular, the bearing plate can have a constant first thickness in the bearing region and a constant second thickness in the remaining regions or at least in the region immediately adjacent thereto, wherein the second thickness is greater than the first thickness and the difference between the second and the first thickness is the step height of the step structure of the upper side of the bearing plate.

The upper side means the side of the bearing plate that faces upwardly when used as intended. The underside means the side of the bearing plate that faces downwardly when used as intended.

The bearing region can form at least part of the inner edge of the upper side of the bearing plate. The bearing region forming at least part of the inner edge of the upper side means that it directly borders at least one of the upper inner edges of the bearing plate. If the bearing region forms the entire edge, this means that all of the upper inner edges directly border the bearing region entirely. If at least part of an upper inner edge does not directly border the bearing region, then the bearing region forms at most part of the inner edge. The inner edges are the edges that define the microscopy opening If the sample chamber is arranged as intended on the sample holder, then the fastening area or the reservoir base area, respectively, can be arranged in the microscopy opening below the bearing region of the bearing plate, in particular, aligned with the underside of the bearing plate or offset downwardly with respect to the underside of the bearing plate.

The sample holder can be formed from aluminum or an aluminum alloy with magnesium.

The distance between the underside of the bearing plate and the bearing region where they border the microscopy opening is referred to as the depth of the microscopy opening. If the underside of the bearing plate and the bearing region are configured to be plane-parallel, then the depth of the microscopy opening corresponds, in particular, to the thickness of the bearing plate below the bearing region. The depth of the microscopy opening can be between 0.2 mm and 5 mm, in particular, between 0.2 mm and 1.5 mm, in particular, between 0.2 mm and 1 mm, in particular, between 0.2 mm and 0.5 mm, or, in particular, between 2 mm and 5 mm, in particular, 2 mm and 4 mm. In particular, the sample chamber can be configured in the form of a microscopy carrier and the depth of the microscopy opening between 0.2 mm and 1.5 mm, in particular, between 0.2 mm and 1 mm, in particular, between 0.2 mm and 0.5 mm. Alternatively, the sample chamber can comprise a multititer plate and the depth of the microscopy opening can be between 0.2 mm and 5 mm, in particular, between 0.5 mm and 5 mm, in particular, between 2 mm and 4 mm.

Both the upper side of the bearing plate as well as the underside of the cover plate of the sample chamber can each have a step structure as described above.

The distance by which the fastening area or the reservoir base area, respectively, is offset downwardly with respect to the bearing area, in particular, the step height of the step structure of the underside of the cover plate and the step height of the step structure of the upper side of the bearing plate and, possibly, the thickness of the base plate can be selected such that the underside of the base plate or the reservoir base area, respectively, in the installed state of the sample chamber aligns with the underside of the bearing plate or is arranged below the underside of the bearing plate.

For example, the sum of the step height of the upper side of the bearing plate and the distance by which the fastening area or the reservoir base area, respectively, is offset downwardly with respect to the bearing area, in particular, the step height of the underside of the cover plate, can be equal to the maximum thickness of the sample holder. The underside of the cover plate, in particular, the fastening area or the reservoir base area, respectively, then aligns with the underside of the bearing plate. If the sample chamber comprises a base plate, then its underside is offset downwardly with respect to the underside of the sample holder. In other words, said distance, in particular, the step height of the underside of the cover plate, can be equal to the depth of the microscopy opening.

Alternatively, the sum of the step height of the upper side of the bearing plate and the distance by which the fastening area or the reservoir base area, respectively, is offset downwardly with respect to the bearing area, in particular, the step height of the underside of the cover plate, and, if the embodiment with a cover plate and base plate is given, the thickness of the base plate can be equal to the maximum thickness of the sample holder. If there is no adhesive layer between the base plate and cover plate, then the underside of the base plate aligns with the underside of the bearing Alternatively, if the embodiment with the cover plate and base plate is given, then the sum of the step height of the upper side of the bearing plate of the sample holder, the distance by which the fastening area is offset downwardly with respect to the bearing area, in particular, the step height of the underside of the cover plate and the thickness of the base plate and the thickness of an adhesive layer between the cover plate and the base plate can be equal to the maximum thickness of the sample holder. The underside of the base plate then aligns with the underside of the bearing plate.

As can be seen above, by combining certain spacings by which the fastening area or the reservoir base area is offset downwardly with respect to the bearing area, in particular, step heights of the underside of the cover plate, and certain step heights of the upper side of the sample holder, it can be set where the underside of the base plate or the reservoir base area is arranged. The combination can therefore be selected such that an arrangement of the base plate or the reservoir base area that is optimal for the respective applications and requirements is given.

This means, the shape of the sample chamber and the sample holder, in particular the above-described distances (i.e. values for the offset) and/or step structures, can be configured to match one another such that the claimed arrangement of the underside of the base plate or the reservoir base area, respectively, is given. This means, for example, matched such that the reservoir base area or the underside of the base plate, respectively, is arranged offset downwardly with respect to the underside of the bearing plate or is received in the microscopy opening.

If the underside of the base plate or the reservoir base area, respectively, is arranged farther down than the underside of the sample holder, then the sample holder can be prevented from being soiled by microscopy, for example, with immersion media from the immersion objective. The risk of damage is also further reduced.

The bearing region can be configured in the form of a continuous area. Alternatively, the bearing region can comprise several partial areas that are separate from one another. In particular, the bearing region can be configured in the form of an area which is arranged circumferentially around the microscopy opening and which comprises at least two discontinuations, wherein the several partial areas of the bearing region are separate from one another by the discontinuations.

With regard to the meaning of a continuous area, of separate partial areas, and of discontinuations, reference is made to the explanations in the context of the bearing area which can be applied analogously.

If the bearing region comprises several partial areas, then all partial areas can be arranged parallel to one another and at the same height.

The bearing region can comprise a first partial area and a second partial area which are separate from one another and are arranged on oppositely disposed sides of the microscopy opening and bordering the microscopy opening. In particular, the microscopy opening can be formed to be rectangular and the first partial area and the second partial area can each be arranged bordering one of the long sides and or each one of the short sides of the microscopy opening.

This means that the first partial area of the bearing region can be arranged on a first long side and the second partial area of the bearing region can be arranged on the second long side disposed opposite this first long side. Alternatively, the first partial area can be arranged on a first short side and the second partial area can be arranged on the second short side disposed opposite this first short side.

Alternatively, the microscopy opening can have a circular base area and the two partial areas can be arranged to be disposed opposite one another, i.e., for example, on the circumference of the circle and on a common line through the center point.

In addition to a first and the second partial area, the bearing region can comprise a third partial area and/or a fourth partial area which are arranged to be separate from one another and from the first partial area and the second partial area. In particular, the microscopy opening can be formed to be rectangular, the first partial area and the second partial area can each be arranged bordering one of the long sides and the third partial area and/or the fourth partial area bordering one of the short sides of the microscopy opening.

This means that one partial area each can be arranged on the two long sides and on one or both of the short sides. Alternatively, one partial area each can also be arranged on both short sides and only on one of the two long sides.

The bearing region can consist of a plurality of, in particular, at least three, partial areas which are arranged to be separate from one another and, in particular, evenly spaced along the microscopy opening. In particular, the microscopy opening can be configured to be round and the partial areas can be arranged, in particular, evenly spaced along the circumference of the upper side of the cover plate.

The bearing region of the sample holder can be congruent with the press-on area and/or the bearing area of the sample chamber.

The bearing plate can comprise openings and/or discontinuations in the bearing region, in particular, the above-described discontinuations of the bearing region. The openings and/or discontinuations can each extend up to the underside of the bearing plate. They can therefore each be configured as a breakthrough in the bearing plate in the bearing region. Alternatively, the openings and/or discontinuations can each be configured in the form of a recess in the bearing plate which does not extend up to the underside of the bearing plate.

The cover plate can comprise at least two, in particular, at least three, in particular, at least four, standing elements which extend downwardly from the bearing area, wherein the standing elements each comprise a standing area which is arranged offset downwardly with respect to the bearing area, is arranged, in particular, offset downwardly with respect to the reservoir base area, or with respect to the underside of the base plate. In particular, the cover plate can comprise the standing elements described above. The openings and/or discontinuations which the bearing region comprises can then be configured and arranged such that the standing elements are received in the openings and/or discontinuations when the sample chamber rests on the sample holder as intended.

In particular, the standing elements can be received entirely in the openings and/or discontinuations. If an opening and/or discontinuation is configured in the form of a breakthrough, then the associated standing element can alternatively extend through the breakthrough and its standing area can be offset downwardly in comparison to the underside of the bearing plate.

The system can comprise a sample hold-down device and the sample chamber can be one of the above-described sample chambers with the press-on area. The sample hold-down device can then be configured such that it presses the sample chamber onto the bearing plate in the installed state. The sample hold-down device comprises, in particular, a single-part or multi-part hold-down structure, for example, comprising one or more webs which press onto the press-on area of the upper side of the cover plate.

The sample hold-down device can be configured such that it affixes the sample chamber in the installed state, for example, such that it does not slip around. In particular, the sample chamber can be firmly clamped by way of the sample hold-down device. The sample hold-down device then enables the entire structure to be mechanically stabilized and the focus stability to be improved accordingly. In addition, the sample hold-down device can be configured such that it makes a sample chamber, which has been curved prior to installation, to assume a planar shape This is particularly advantageous in the case of a sample chamber with a cover plate made of plastic material. Such cover plates tend to warp due to the material properties and the production techniques.

In the installed state, the sample hold-down device can be fastened to the sample holder or to a microscope stage, for example, the microscope stage described below.

The sample hold-down device can be configured and arranged such that it presses the sample chamber onto the bearing plate by way of gravity and/or magnetic force and/or mechanical spring force. Alternatively or additionally, the sample holder can be screwed to the sample holder by way of one or more screws when used as intended. In particular, the sample chamber can then be clamped in the region of the press-on area between the sample holder and the bearing plate of the sample holder. The screw or screws of the screws can be arranged, in particular, in a region outside the bearing region of the sample holder.

The cover plate can have, in particular, a rectangular base area and the press-on area can comprise two partial areas which are arranged on oppositely disposed sides, in particular, the two long sides of the cover plate. The hold-down structure can then comprise two discontinuous or continuous webs, wherein one web each rests on one of the partial areas of the press-on areas.

The hold-down structure can be configured, in particular, such that it rests exclusively on the press-on areas of the sample chamber when arranged as intended.

The hold-down structure and the sample holder can be configured such that the hold-down structure rests on the press-on area only in a region that is congruent with the bearing region of the bearing plate when arranged as intended.

As an alternative or in addition, the system can comprise a microscope stage. The sample holder can be configured integrally with the microscope stage or be configured separately therefrom and rest on the microscope stage when used as intended or be inserted thereinto as an insert The microscope stage of an inverted microscope is configured such that it holds the sample chamber arranged as intended in a position above the objective.

The invention also relates to a use of one of the sample chambers described above for microscoping cells which are disposed in the reservoir of the sample chamber, in particular, for live cell microscopy. The invention can comprise, in particular, a use of the sample chamber for the growth of cell cultures, in particular, comprising a supply of the cells with nutrients.

The invention also relates to a use of one of the systems described above for microscoping cells which are disposed in the reservoir of the sample chamber, in particular, for live cell microscopy. In particular, the use can comprise that the sample chamber is temperature-controlled, in particular, by supplying heat by way of heat conduction through the sample holder and/or the microscope stage. The invention can comprise, in particular, a use of the system for the growth of cell cultures, in particular, comprising a supply of the cells with nutrients.

Microscoping can comprise inverse high-resolution microscoping with a high-aperture immersion objective.

Further features and advantages shall be explained below using the exemplary figures, wherein FIG. 1a shows a schematic cross section, not to scale, of a first embodiment of the sample chamber;

FIG. 5 shows a schematic top view, not to scale, onto the embodiment of the system shown in FIG. 4a;

FIGS. 6b to 6d show schematic representations, not true to scale, of hold-down structures;

FIGS. 6e to 6g show schematic representations, not true to scale, of warped or bent sample chambers;

Unless otherwise specified below, the same reference symbols are used in the figures for elements with the same designation.

Figure 1A:
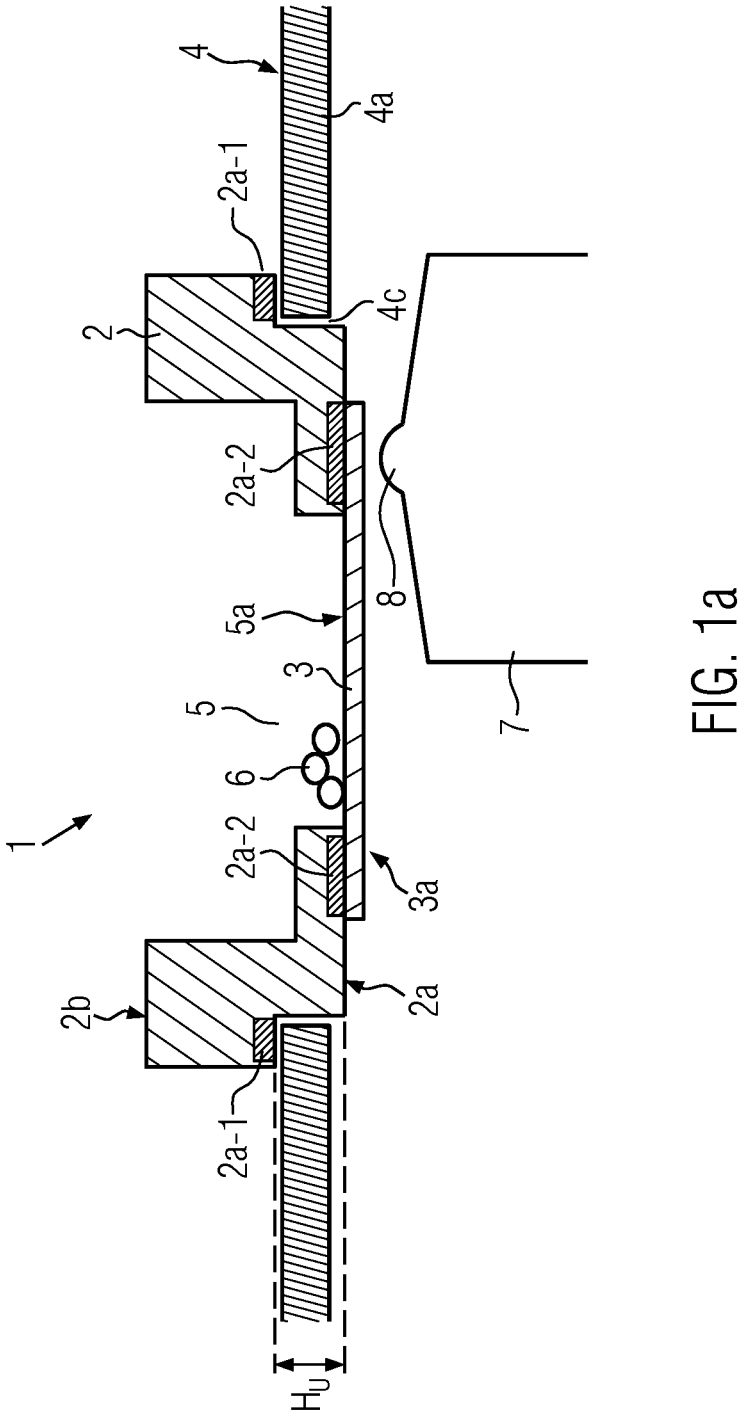
FIG. 1b shows a schematic top view, not to scale, onto a first embodiment of the sample chamber.
FIG. 1c shows a schematic longitudinal sectional view, not to scale, of the first embodiment of the sample chamber.
FIGS. 1d to 1m show a schematic representation, not true to scale, of modifications of the first embodiment of the sample chamber.

FIG. 1a shows a cross section of a sample chamber 1 according to a first embodiment. The sample chamber comprises a cover plate 2 which is presently open, for example, towards the bottom in the region of reservoir 5 and a base plate 3 fastened to the cover plate, wherein the base plate forms reservoir base 5a. This can be, for example, a cover plate in the form of an injection-molded member made of plastic material and a base plate in the form of a cover glass base.

The cover glass base can be made of plastic material or glass. The shape, in particular, the thickness, and the material of the cover glass base are selected such that microscopy can be performed through the cover glass base.

The cover plate and the base plate are configured and arranged such that they together form a reservoir 5 for cells 6. A sample chamber with a single reservoir is presently shown in a simplified manner, but alternatively, the sample chamber can comprise a plurality of reservoirs which are then arranged, for example, next to one another and separated from one another by walls. Exemplary sample chambers with a plurality of reservoirs are shown in FIGS. 1g, 1h, 1k, 11 and 7a to 7c.

Figure 6A:
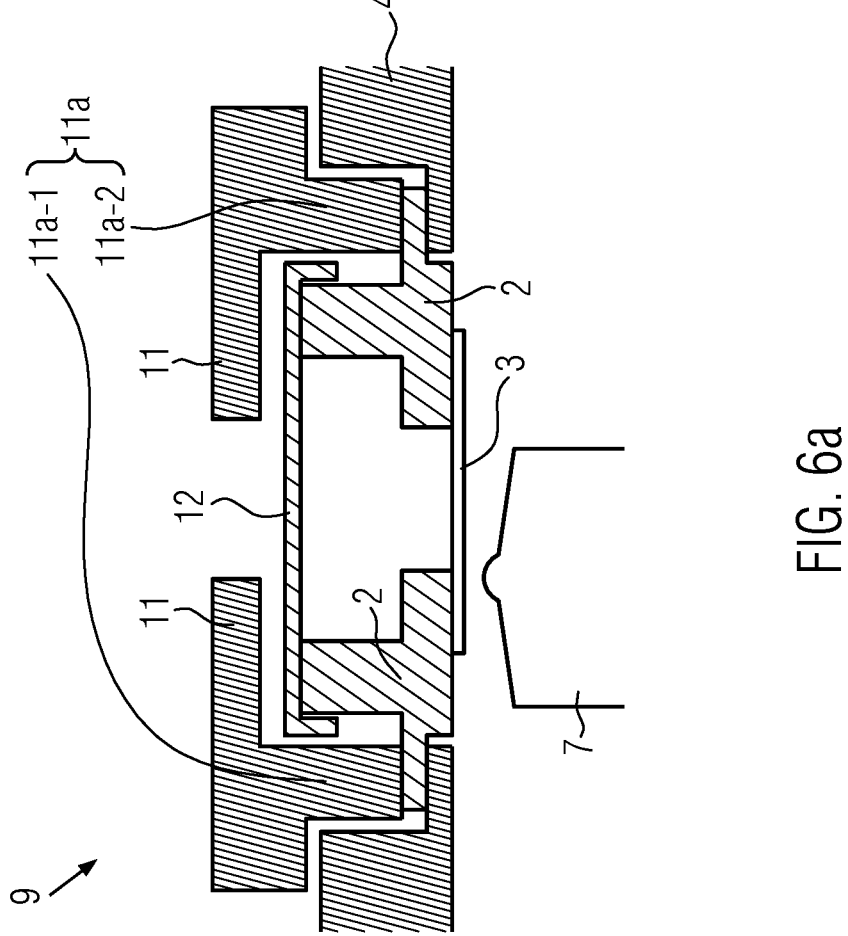
FIG. 6a shows a schematic cross section, not to scale, of an embodiment of a system with a sample chamber, s sample holder, and a sample hold-down device.

The reservoir in FIG. 1a is open towards the top, but it is conceivable that the reservoir is covered from above, either in that the cover plate itself is configured such that it covers the reservoir, or in that a cover 12 is placed on top of the cover plate, in particular, fastened thereto. An exemplary embodiment with a cover is shown in FIG. 6a.

The base plate is fastened to underside 2a of the cover plate. More precisely, the underside of the cover plate comprises a bearing area 2a-1 and a fastening area 2a-2. They are each presently formed to be planar and arranged parallel to one another. When the sample chamber is installed, bearing area 2a-1 rests on the sample holder. The base plate is fastened to fastening area 2a-2 of the underside of the cover plate. In the present example, the underside of the base plate is also configured and arranged to be planar and parallel to the bearing area and the fastening area.

The fastening area is arranged offset downwardly with respect to the bearing area, for example, by a height $H_U$. In the present case, the underside of the cover plate then has a step structure. Height $H_U$ is also referred to as the step height of this step structure.

The sample chamber is shown in FIG. 1a in the intended orientation in which underside 3a of the base plate faces downwardly. In particular, the bearing area, the fastening area, and the underside of the base plate are presently arranged horizontally.

A part of a sample holder 4 is also shown for illustration purposes in FIG. 1 and is not part of the sample chamber. The sample holder shown there comprises a bearing plate 4a with a microscopy opening 4c. The sample chamber is shown in the intended arrangement on the sample holder.

As can be seen from this illustration, part of the step structure projects into the microscopy opening. More precisely, the sample chamber rests with the bearing area of its underside on the upper side of the bearing plate. Part of the cover plate bordering the bearing area extends downwardly into the microscopy opening, presently, in particular, through the microscopy opening. The fastening area to which the base plate is fastened is arranged at the lower end of this part of the cover plate.

The base plate does not rest on the sample holder. It is instead arranged below the microscopy opening. The underside of the base plate is offset downwardly with respect to the underside of the bearing plate, namely by a distance A.

Part of an optical system, namely objective 7, for example an immersion objective, is also shown in FIG. 1a for illustration purposes with front lens 8 which is also not part of the sample chamber. It can be seen in the illustration that it is possible to approach the front lens towards the underside of the base plate over its entire width without running the risk of striking bearing plate 4a of the sample holder when the objective is moved sideways.

Figure 1B:
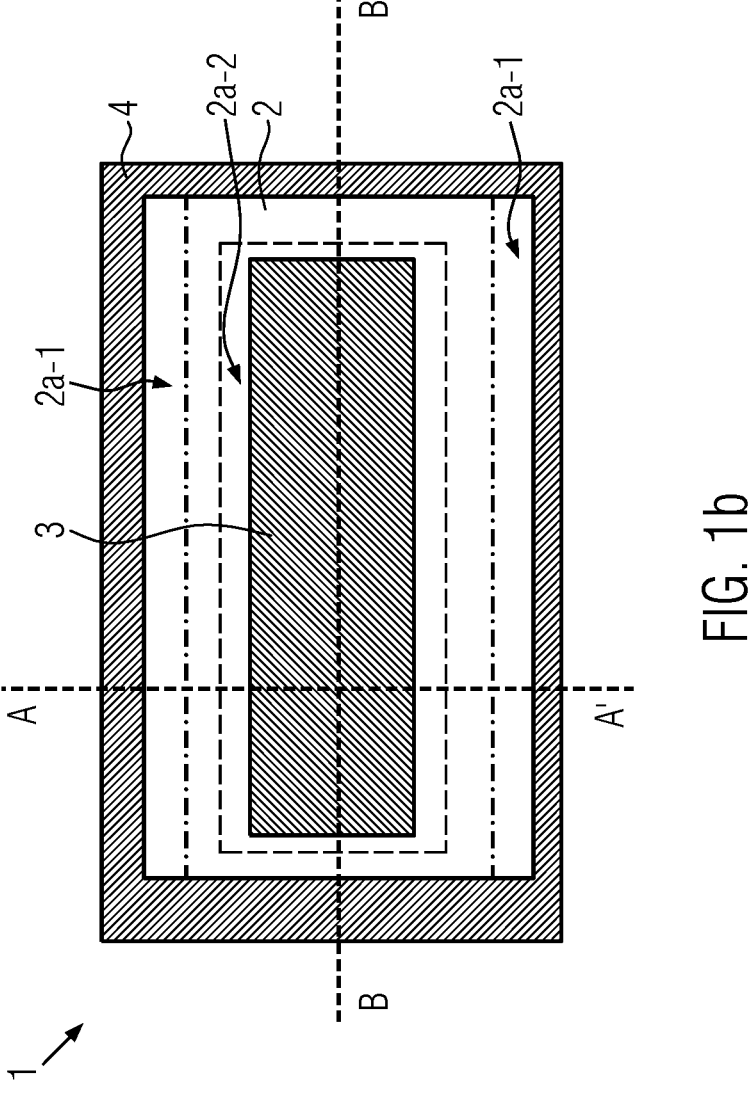

A top view onto the sample chamber 1 is shown in FIG. 1b, wherein the cross section shown in FIG. 1a extends along line A-A'. The position of the base plate and, if covered by the sample chamber, the boundary of the microscopy opening are shown by dashed lines. A cover plate 2 is shown there by way of example, upper side 2b and underside 2a of which have a rectangular basic shape.

It is shown in FIG. 1b that bearing area 2a-1 comprises two separate partial areas which are arranged to be disposed opposite one another. One partial area arranged on each of the long sides of the underside of the cover plate is shown there by way of example. The bearing area there forms part of the edge of the underside, namely the edge on the two long sides of the underside. There is no bearing area provided on the two short sides.

Figure 1C:
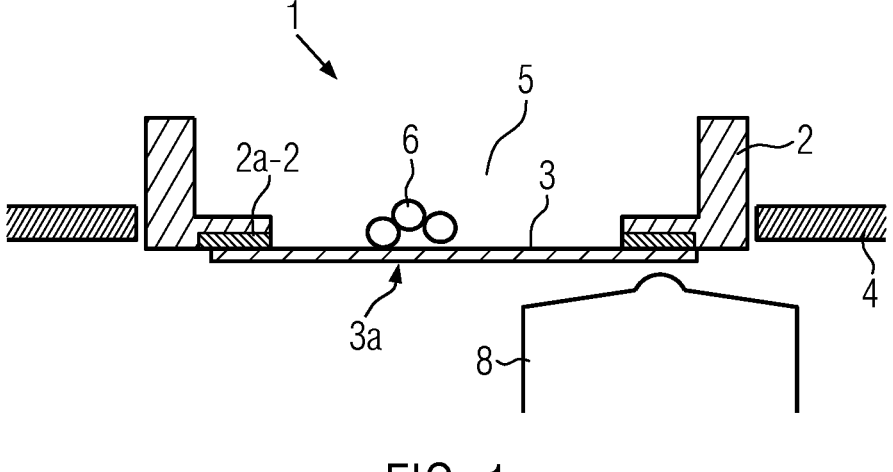

FIG. 1c shows a longitudinal sectional view along line B-B' illustrated in FIG. 1b so that it can be seen how the cover plate is configured at the short ends in this example, namely without a step structure. The outer side wall of the cover plate instead extends straight downwardly towards the fastening area.

As an alternative to the variant shown in FIGS. 1b and 1c, the two partial areas of the bearing area can also be arranged on the two short sides of the underside of the cover plate or, in addition to the two partial areas on the long sides, a partial area of the bearing area can each be arranged on one or both short sides.

Figure 1D:
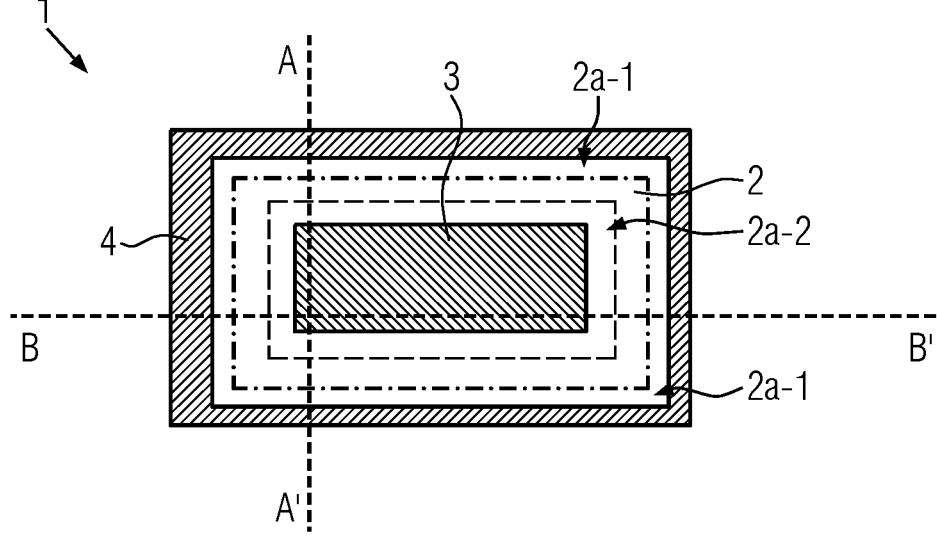

Alternatively, a single continuous circumferential bearing area can be provided, as indicated in the top view in FIG. 1*d*.

Figure 1E:
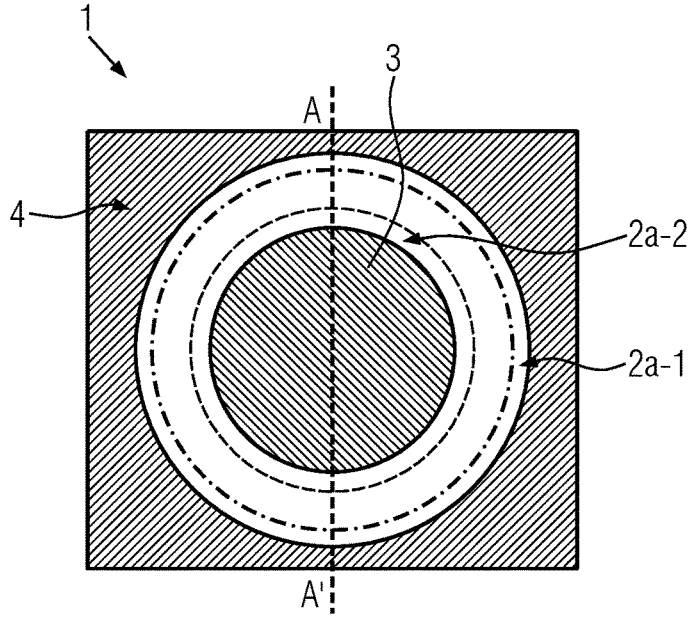

A modification of the first embodiment is shown in FIG. 1*e* as a top view. Cover plate 2 and base plate 3 have a circular basic shape. Underside 2*a* of the cover plate can have a step structure such that it has a cross section like the cross section shown in FIG. 1*a*. Bearing area 2*a*-1 there forms an inner edge of the underside of the cover plate. The bearing area is there continuous and configured in the shape of a circular ring.

Figure 1F:
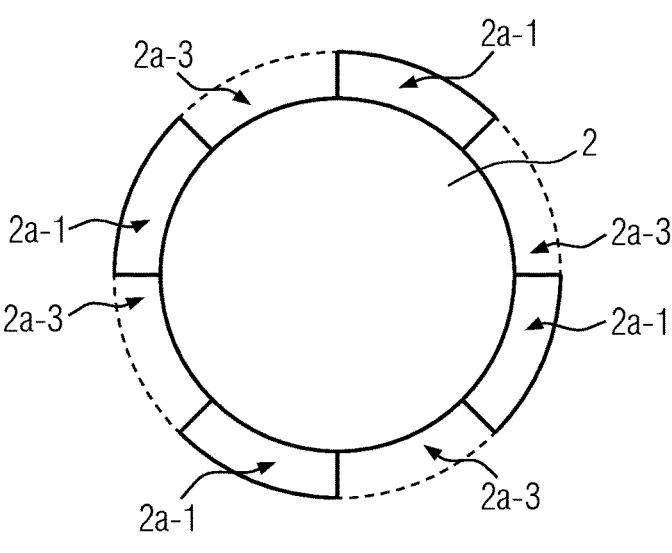

The edge can alternatively also be configured in the shape of a circular ring with several discontinuations 2*a*-3 so that the bearing area comprises several partial areas separated from one another, as shown in simplified form in FIG. 1*f*. The discontinuations therefore form separating elements between the partial areas. In this embodiment, the bearing areas are arranged along the circumference of the circle, presently by way of example evenly spaced. Alternatively, unlike shown there, only two or three or more than four partial areas, can also be provided.

Figure 1G:
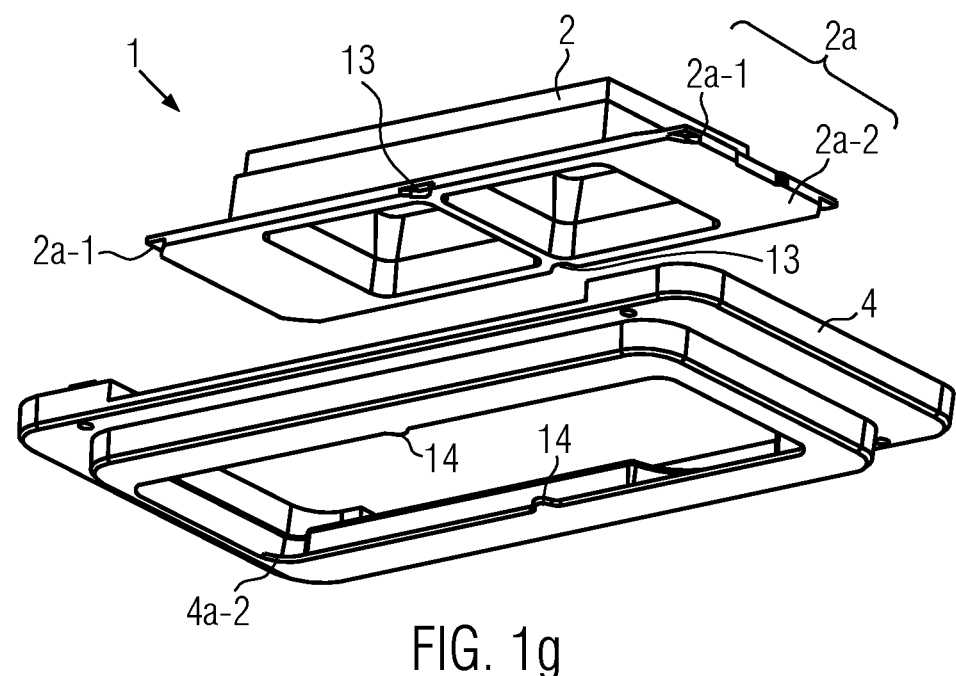
Figure 1H:
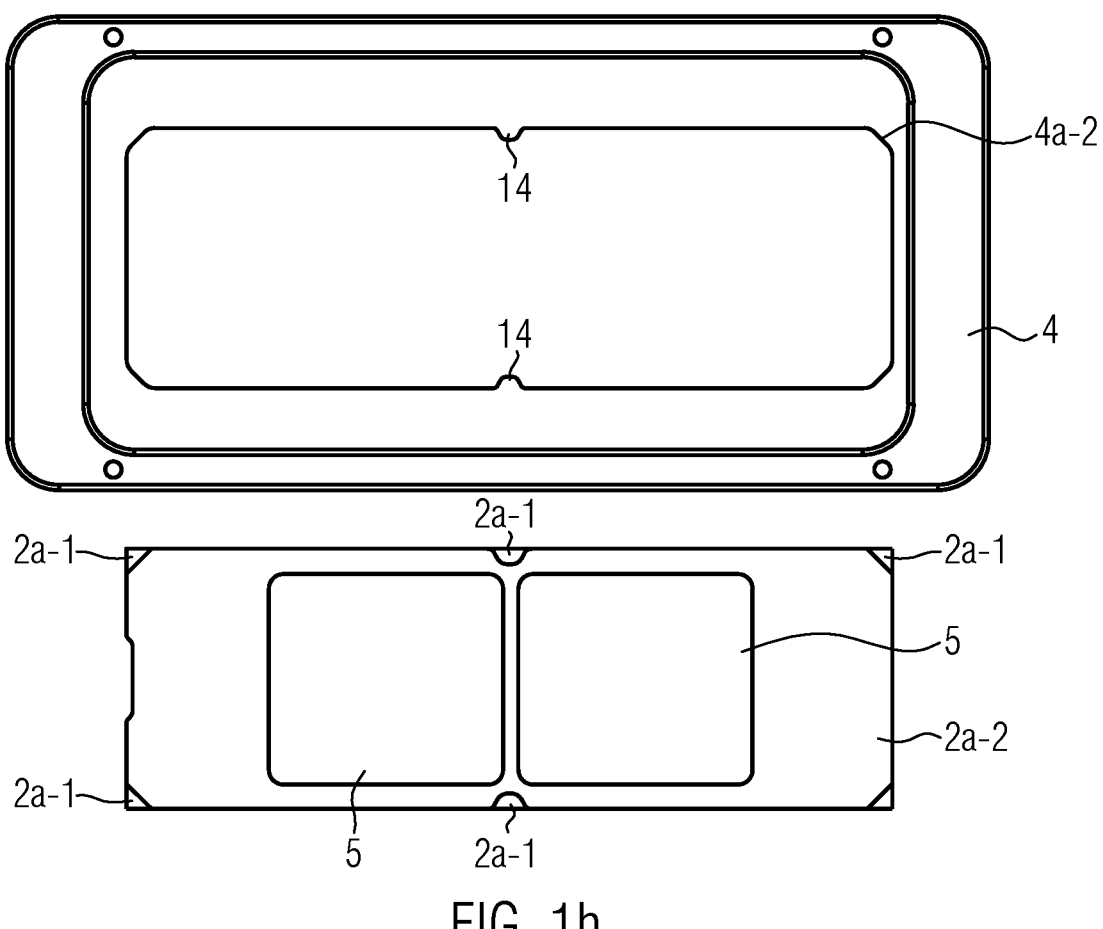

A further modification of the first embodiment is shown in FIGS. 1*g* and 1*h* in a view at an angle from below and in a top view onto the underside of cover plate 2. For the sake of clarity, the illustration of the base plate is presently dispensed with which can be configured, for example, like in FIGS. 1*a* to 1*d* and is fastened to fastening area 2*a*-2. By way of example, the sample chamber presently comprises two reservoirs 5.

As can presently be seen, cover plate 2 is formed to be substantially rectangular and the underside of the cover plate comprises a partial area of the bearing area at each of the corners. It additionally comprises a further partial area of the bearing area on each of the long sides of the rectangle, presently approximately in the middle. The bearing area therefore comprises a total of six partial areas. It can respectively be seen in the view at an angle that the underside is configured such that a respective step structure is formed by each partial area and the fastening area offset downwardly.

The shape of the bearing areas on the long sides gives rise to two receptacles 13 in the underside of the sample chamber, presently for example, receptacles defined laterally towards the inner side of the cover plate which are defined to the top by the bearing area.

The partial areas at the corners each have a triangular shape by way of example and the partial area on the long sides are each semicircular. The bearing area presently makes up less than 10% of the total area of the underside of the cover plate. In particular, it can make up less than 5%, in particular, less than 2% of the total area of the underside.

To illustrate the embodiment, a respective sample holder is also shown in FIGS. 1*g* and 1*h* in order to illustrate how the partial areas of the bearing area can each rest on the bearing region of the bearing plate of an exemplary sample holder. In the case presently shown, the sample holder has a substantially rectangular microscopy opening, at the corners and on parts of the long sides of which the sample chamber, more precisely, its bearing area, rests on the bearing region. In this example, the bearing region of the sample holder has a semicircular structure 14 on each of the long sides of the microscopy opening. It is received in the receptacles on the underside of the sample chamber when the sample chamber is arranged as intended on the sample holder.

A system according to the invention comprises the sample chamber and the sample holder as shown in FIGS. 1*g* and 1*h* and described above.

Figure 1I:
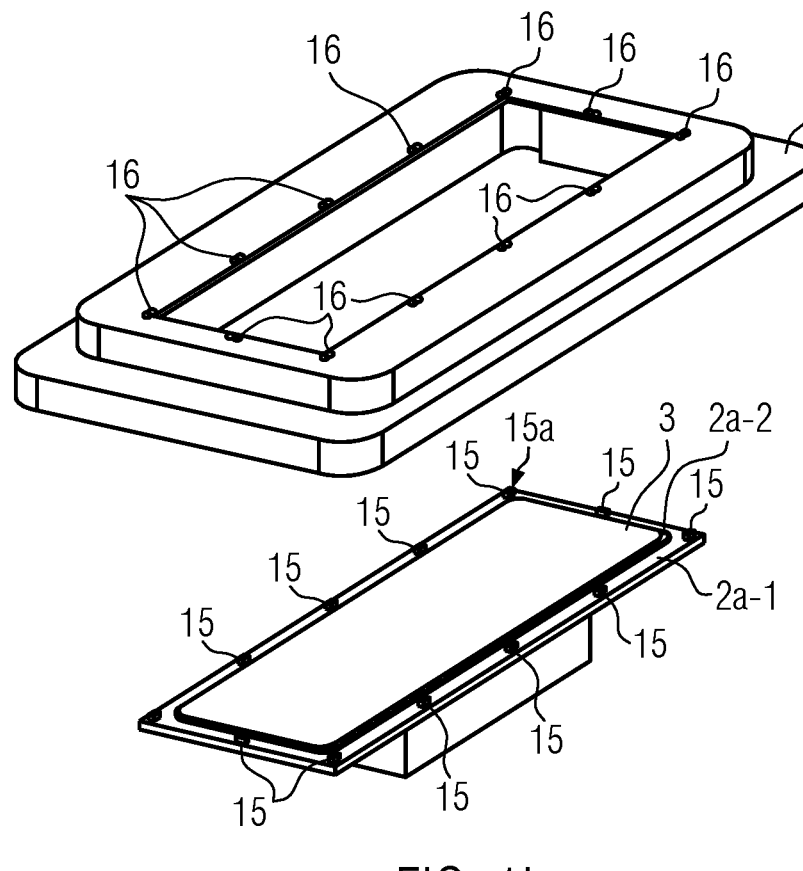
Figure 1J:
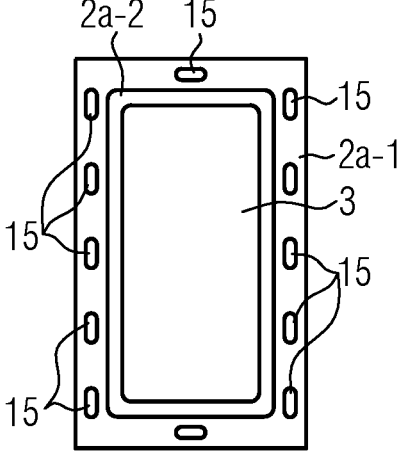

A further modification of the first embodiment is shown in FIGS. 1*i* and 1*j* in a view at an angle from below (the sample chamber and the sample holder in FIG. 1*i* are therefore with their undersides facing upwardly and therefore not illustrated in the orientation for intended use) and in a top view onto the underside of cover plate 2. The underside of the cover plate comprises several standing elements 15 in the region of the bearing area. Standing areas 15*a* of the standing elements are offset downwardly with respect to the bearing area at least as far as the underside of the base plate. When the sample chamber is standing, for example, on a flat area, for example on a table, it therefore also stands on the standing elements, in particular, only on the standing elements if the standing areas are offset further downwardly than the underside of the base plate.

A respective sample holder is also shown in FIGS. 1*i* and 1*j* for the illustration of the embodiment, the bearing plate of which comprises openings 16 in the region of the bearing region which are configured and arranged such that the standing elements are received in the openings when the sample chamber rests on the sample holder as intended. The openings there extend up to the underside of the bearing plate, they are therefore configured as breakthroughs through the bearing plate. Alternatively, they can also be configured as receptacles that do not extend up to the underside of the bearing plate, i.e., are closed at the bottom.

A system according to the invention comprises the sample chamber and the sample holder as shown in FIGS. 1*i* and 1*j*.

Figure 1K:
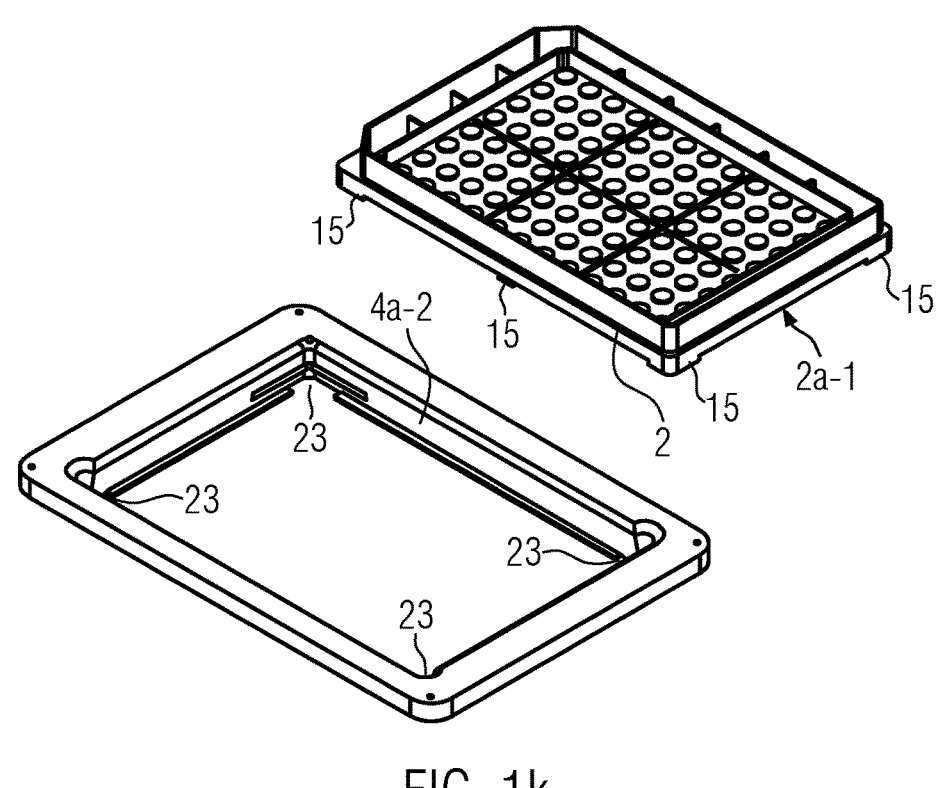
Figure 1L:
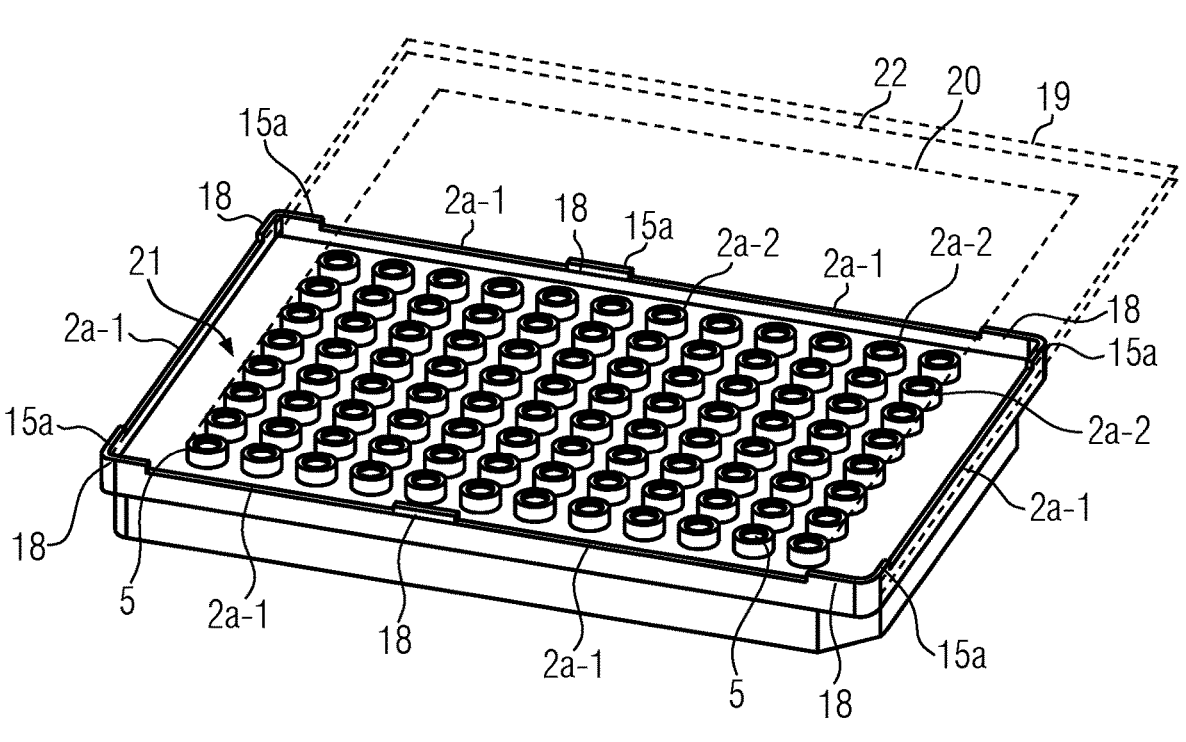

A further modification of the first embodiment is shown in FIGS. 1*k* and 1*l* in a view at an angle from above and in a view at an angle from below onto cover plate 2.

For the sake of clarity, the illustration of the base plate is presently dispensed with, which can be configured, for example, like in FIGS. 1*a* to 1*d*. By way of example, the sample chamber presently comprises a plurality of reservoirs.

The underside of the cover plate comprises several standing elements in the region of the bearing area which extend downwardly from the bearing area. The bearing area there comprises several partial areas which are separate from one another by separating elements 18 in the form of the standing elements. More precisely, in a top view onto the sample chamber, the bearing area is configured in the form of an area which is arranged circumferentially around the fastening area and which is subdivided into the separate partial areas by standing elements.

The standing elements in FIGS. 1*k* and 1*l* are arranged at the corners and on the long sides of the substantially rectangular-shaped underside of the cover plate. The standing elements there together with the bearing areas form a presently continuous circumferential edge of the underside of the cover plate, which, however, does not necessarily have to be the case. In particular, the edge can also have one or more discontinuations which further subdivide the bearing area.

The standing areas of the standing elements are offset downwardly with respect to the bearing area at least as far as the underside of the base plate. When the sample chamber is standing, for example, on a flat area, it therefore also stands on the standing elements, in particular, only on the standing elements if the standing areas are offset further downwardly than the underside of the base plate.

A cover plate is shown in the present case by way of example, wherein the bearing area is arranged in a first plane 19 which is arranged horizontally for intended use, and the fastening area is arranged in a second plane 20 which is arranged horizontally for intended use. The underside of the cover plate comprises an area 21 between the bearing area and the fastening area which is arranged in a third plane 22 which is arranged horizontally for intended use and which is arranged offset upwardly with respect to the bearing area.

A sample holder is also shown in FIG. 1$k$ for the illustration of the embodiment, the bearing plate of which comprises discontinuations 23 in the bearing region which are configured and arranged such that the standing elements are received in the discontinuations when the sample chamber rests on the sample holder as intended. The discontinuations there extend up to the underside of the bearing plate, they are therefore configured as breakthroughs through the bearing plate. Alternatively, they can also be configured as receptacles that do not extend up to the underside of the bearing plate, i.e., are closed at the bottom.

In particular, the standing elements can be received entirely in the discontinuations. In the case of discontinuations in the form of breakthroughs, however, the standing elements can also extend through the breakthroughs and their standing area can be offset downwardly as compared to the underside of the bearing plate.

A system according to the invention comprises the sample chamber and the sample holder as shown in FIGS. 1$k$ and 1$l$.

A further modification of the first embodiment is shown in FIG. 1$m$ in a cross-sectional view. The underside of cover plate 2 comprises a bearing area 2$a$-1 and a reservoir base area 2$a$-4. A reservoir 5 is there formed in cover plate 2 of the sample chamber. The cover plate therefore provides at least the lower boundary, i.e. the reservoir base, and the lateral boundary of the reservoir. Unlike in the above embodiments, the cover plate is not open to the bottom in the region of the reservoirs. In principle, the above explanations apply analogously, although the reservoir base in this modification is not formed by a base plate fastened to the cover plate, which base plate is fastened to a fastening area on the underside of the cover plate. The explanations for the configuration and arrangement of the fastening area in this modification apply accordingly in analogy for the reservoir base area.

Figure 1M:
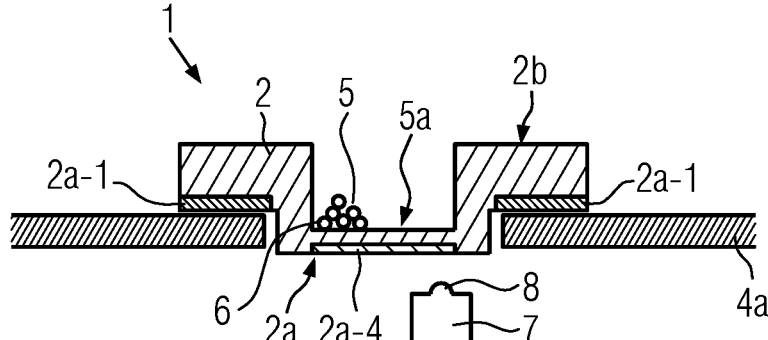
Figure 2:
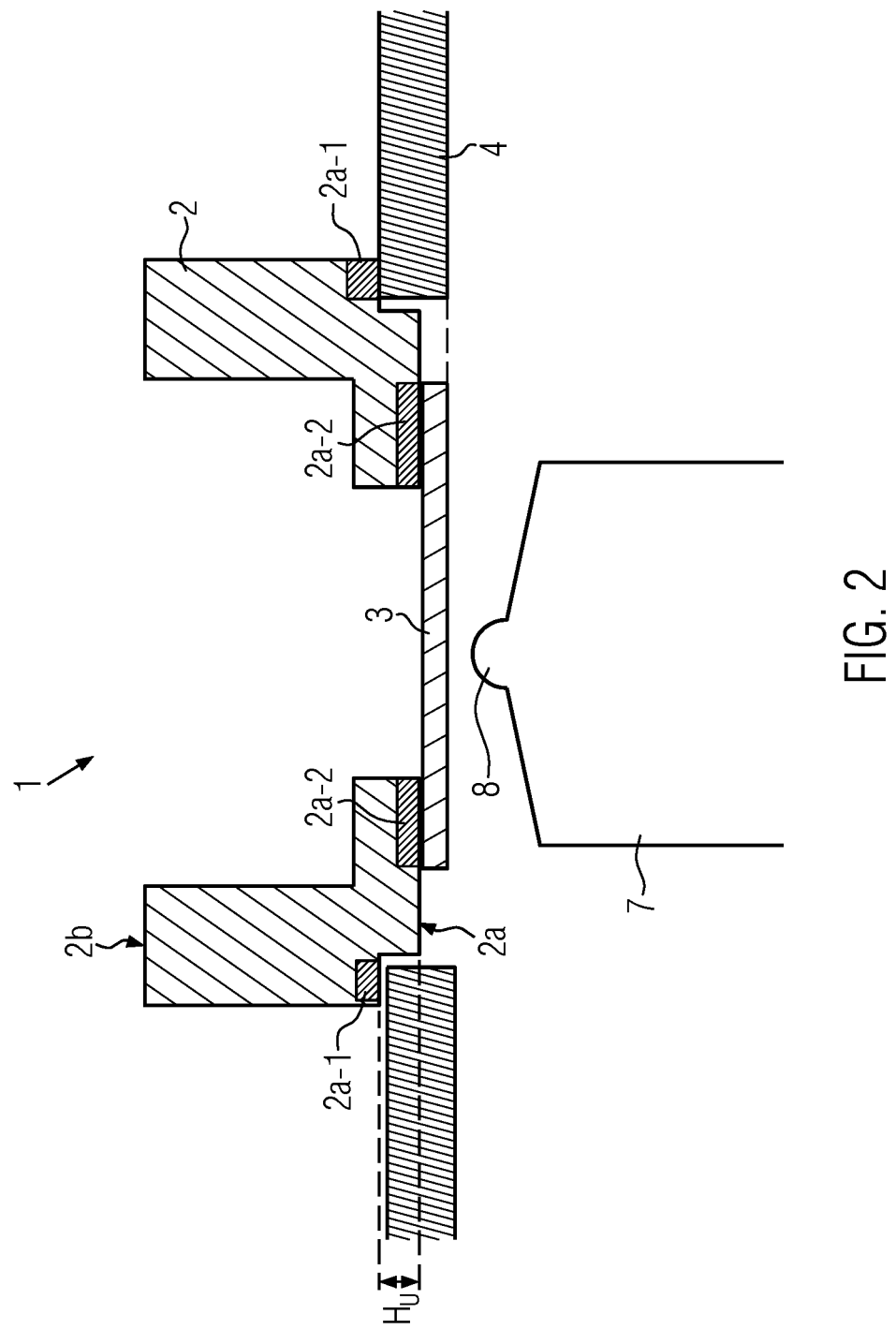
FIG. 2 shows a schematic cross section, not to scale, of a second embodiment of the sample chamber.

FIG. 2 shows a cross section of a sample chamber 1 according to a second embodiment. It is configured substantially like the sample chamber shown in FIG. 1$a$. However, the fastening area is there offset less far downwardly with respect to the bearing area than in the first embodiment. Step height $H_U$ is therefore smaller than in the embodiment shown in FIG. 1$a$.

There as well, the part of a sample holder already shown in FIG. 1$a$ is shown for illustration purposes and the sample chamber is shown in the intended arrangement on the sample holder The underside of the base plate in FIG. 2 is flush with the underside of the sample holder, instead of being offset downwardly with respect to the underside of the sample holder like in FIG. 1$a$. Here as well, approaching the front lens towards the underside of the base plate is possible over its entire width without running the risk of striking the bearing plate of the sample holder when the objective is moved sideways. With the same approach to the base plate as in FIG. 1$a$, the front lens must be approached closer to the sample holder in the embodiment shown in FIG. 2. However, the cover plate is arranged in a more protected manner in the microscopy opening than in the example shown in FIG. 1$a$, wherein it is comparatively exposed.

Based on a comparison of the two embodiments, it can be seen that step height $H_U$ of the underside of the cover plate, when using a base plate with a predetermined thickness and having the same depth $T_M$ of the microscopy opening, is crucial for where the underside of the base plate is disposed in the installed state relative to the underside of the bearing plate of the sample holder.

Figure 3:
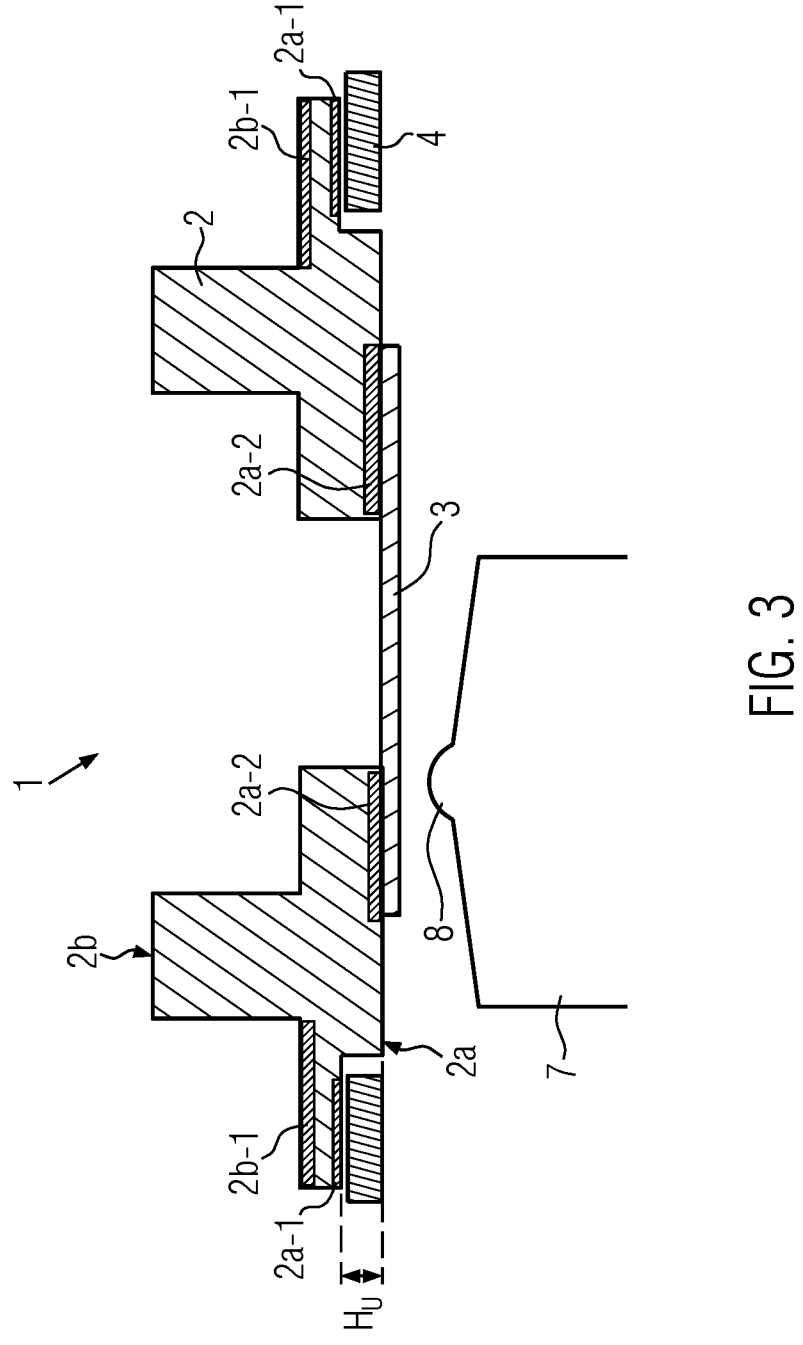
FIG. 3 shows a schematic cross section, not to scale, of a third embodiment of the sample chamber.

FIG. 3 shows a cross section of a sample chamber 1 according to a third embodiment which is a modification of the first and the second embodiment. There as well, the underside of the cover plate has a step structure. For illustration purposes, FIG. 3 also shows the part of a sample holder already illustrated in FIG. 1$a$ and shows the sample chamber in the intended arrangement on the sample holder. A step structure of the underside is shown there by way of example with a step height $H_U$ that is between the step height of the first and the step height of the second embodiment. However, other step heights, in particular, like in the first or the second embodiment, are also possible. The underside of the cover plate in FIG. 3 aligns with the underside of the sample holder, which means that the step height of the underside $H_U$ is equal to the depth $T_M$ of the microscopy opening. Accordingly, the underside of the base plate is offset downwardly with respect to the underside of the sample holder.

Unlike the embodiments in FIGS. 1 and 2, upper side 2$b$ of the cover plate in the embodiment shown in FIG. 3 comprises a downwardly offset press-on area 2$b$-1 so that a step structure is formed. More precisely, the step structure comprises a press-on area 2$b$-1 offset downwardly by the distance $H_O$ with respect to the remaining regions of the upper side of the cover plate. The press-on area is arranged to be disposed opposite bearing area 2$a$-1, wherein the width of the press-on area is greater in this example than the width of the bearing area. However, the width of the press-on area can also be smaller than the width or equal to the width of the bearing area. In particular, the width of the press-on area can be equal to the width of the bearing area and the press-on area and the bearing area can be configured such that they are congruent.

Figure 4A:
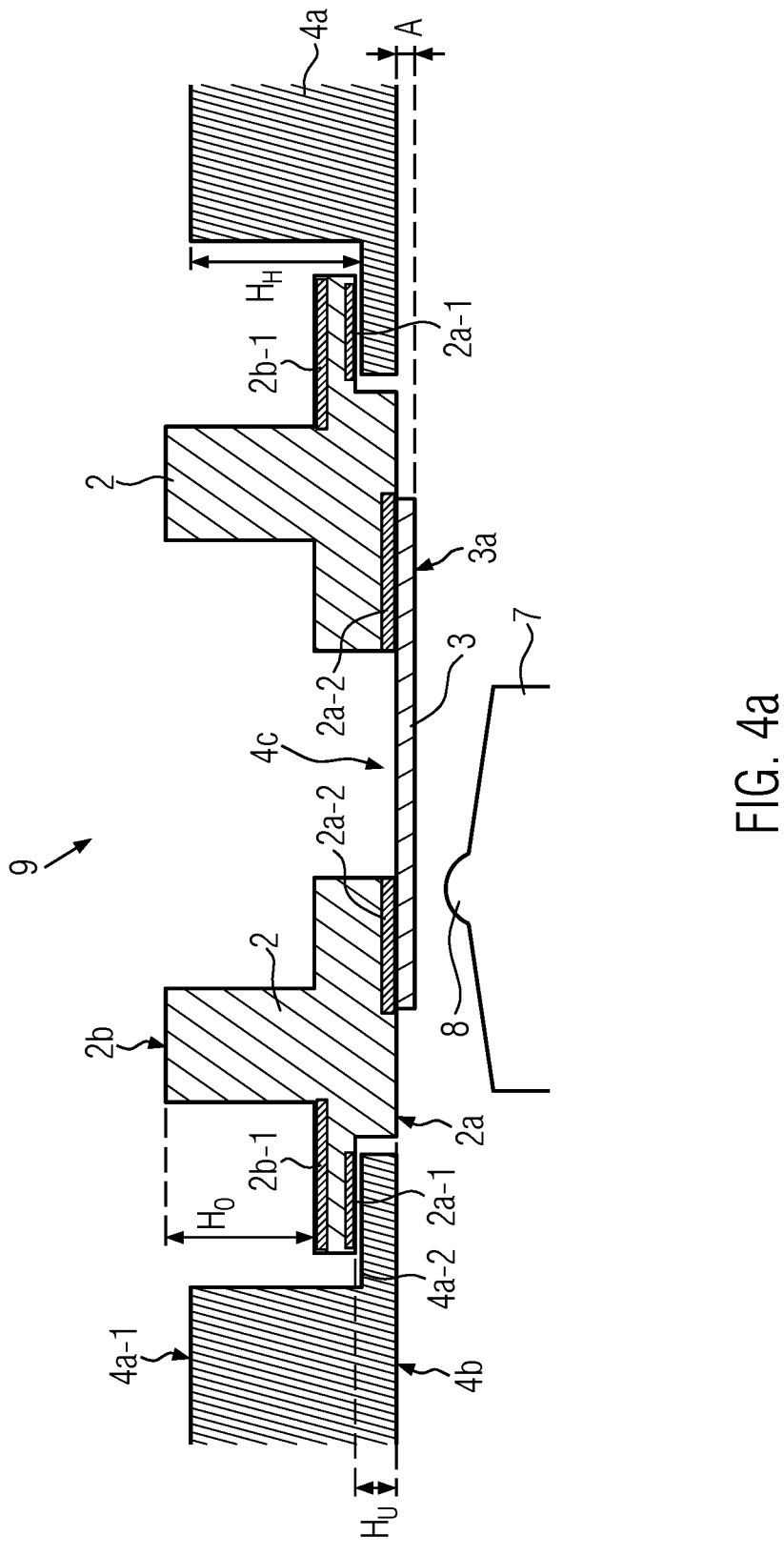
FIG. 4a shows a schematic cross section, not to scale, of an embodiment of a system with a sample holder and a sample chamber.
Figure 4B:
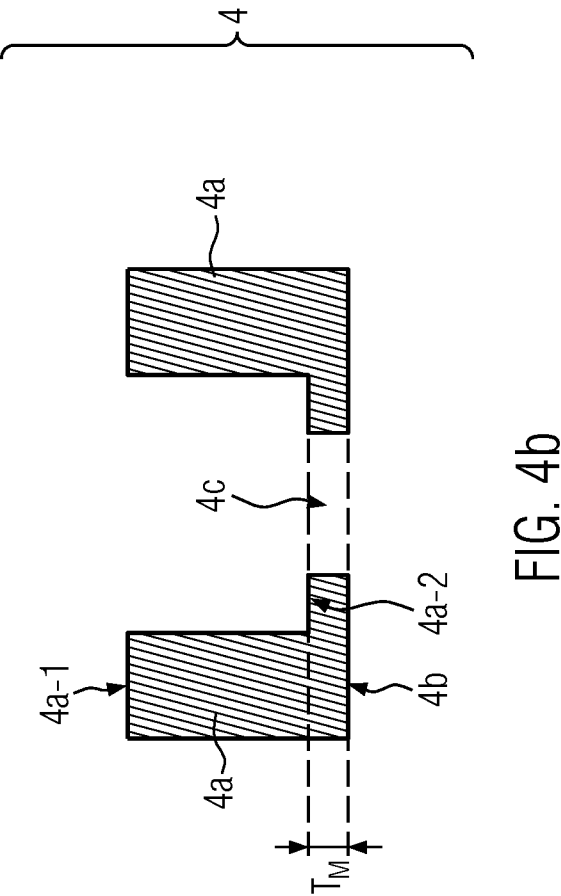
FIG. 4b shows a schematic representation, not to scale, of part of the sample holder.

FIGS. 4$a$ and 5 show, in cross section and in a top view, an embodiment of a system 9 comprising a sample chamber 1 and a sample holder 4 which comprises a bearing plate 4$a$ with a microscopy opening 4$c$. The sample holder without a sample chamber is shown schematically in FIG. 4$b$ in a cross section for illustration purposes.

Figure 5:
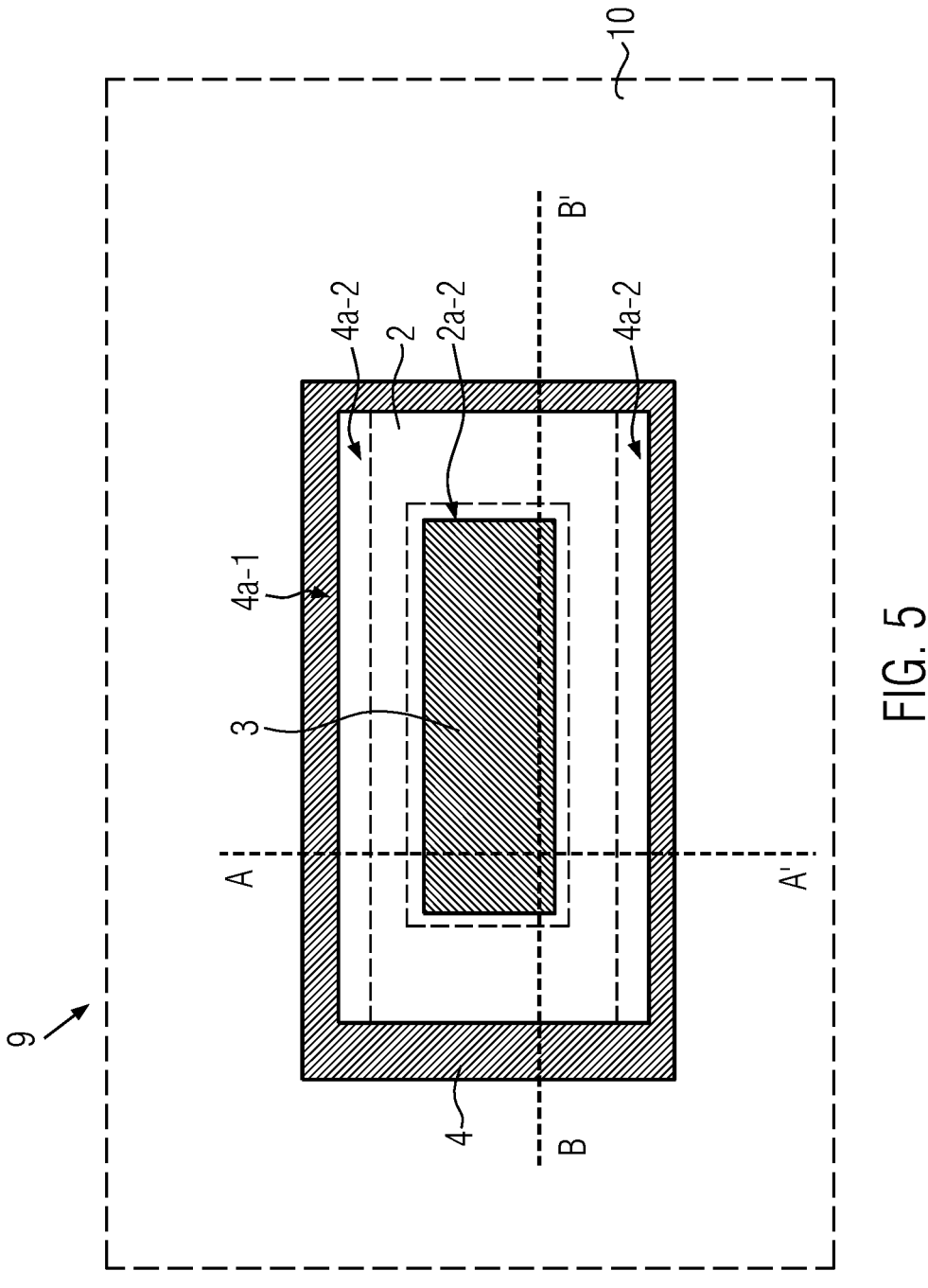

The system can optionally comprise a microscope stage 10, which is only shown in FIG. 5 for the sake of clarity, and/or an optical system, in particular, an objective 7 with a front lens 8. The sample holder 4 can be a separate component or can be formed integrally with the microscope stage.

The sample chamber is shown in the intended arrangement on the sample holder. Sample chamber 1 also comprises a cover plate 2 there as well and a base plate 3 fastened to an underside 2$a$ of the cover plate, wherein the cover plate and the base plate are configured and arranged such that they together form a reservoir 5 for cells 6. The sample chamber can be one of the sample chambers described above.

The sample chamber and the sample holder are configured in the system shown in FIG. 4$a$ such that, when the sample chamber is arranged as intended on the sample holder, underside 3$a$ of the base plate is offset downwardly with respect to underside 4$b$ of the bearing plate. Alternatively, the base plate can be received in the microscopy opening, in particular, such that the underside of the base plate aligns with an underside of the bearing plate, as shown in FIG. 2.

In the example presently shown, underside 2a of the cover plate, more precisely, fastening area 2a-2, aligns with underside 4b of the bearing plate. The step height of the underside $H_U$ is equal to the depth $T_M$ of the microscopy opening. Alternatively, however, as shown for example in FIG. 1 or 2, the step height of the underside $H_U$ can be greater or smaller than the depth $T_M$ of the microscopy opening.

In this embodiment, upper side 4a-1 of bearing plate 4a of sample holder 4 comprises a bearing region 4a-2. The bearing region is arranged offset downwardly by a step height $H_H$ with respect to other regions of the upper side of the bearing plate so that the upper side of the bearing plate has a step structure.

When the sample chamber is arranged as intended, it rests on bearing region 4a-2, as can be seen in FIG. 4a. The bearing region presently forms part of the inner edge of the upper side of the bearing plate, i.e. it directly borders the microscopy opening. As can be seen in the top view in FIG. 5, the bearing region there consists of two partial areas, also referred to as hereafter as partial regions, which each extend along the longitudinal side of the microscopy opening. The bearing area of the cover plate comprises two partial areas which run along the longitudinal side and which each rest on one of the partial regions of the bearing region.

In this example, the width of the bearing region is greater than the width of the bearing area. The width of the bearing region can alternatively be equal to the width of the bearing area. In particular, the bearing region and the bearing area can be configured such that they have the same shape and size. When the sample chamber is arranged as intended, they are then congruent.

In the example presently shown, the distance between underside 4b of the bearing plate and bearing region 4a-2, i.e. the depth of the microscopy opening $T_M$, is equal to the step height $H_U$ of the underside of the cover plate. As a result, the underside of the cover plate and the underside of the bearing plate align when the sample chamber is installed as intended.

In the present case, upper side 2b of the cover plate of the sample chamber comprises a press-on area 2b-1 which is arranged to be disposed opposite bearing area 2a-1 and is offset downwardly with respect to other regions of the upper side so that a step structure is formed. For example, it can be a sample chamber which comprises one of the press-on areas described in the context of FIG. 3.

Alternatively, the upper side of the cover plate can also be configured without a downwardly offset press-on area, for example, like the upper side shown in FIG. 1 or FIG. 2.

FIG. 6a shows a cross section of a system comprising a sample chamber and a sample holder which can be configured like in FIGS. 4, 4a, and 5. Alternatively, however, a differently configured sample chamber according to the invention and a differently configured sample holder according to the invention can also be provided. The upper side of bearing plate 4a of the sample holder comprises a downwardly offset bearing region 4a-2 so that a step structure is formed, wherein the bearing region forms part of the inner edge of the bearing plate. For example, the bearing region can comprise two separate partial regions, in particular, consist of two separate partial regions, which are disposed opposite one another and each along one of the long sides of the microscopy opening.

Upper side 2b of the sample chamber comprises a downwardly offset press-on area 2b-1 which is arranged to be disposed opposite bearing area 2a-1 so that a step structure is formed, wherein the bearing area and the press-on area each form part of the outer edge of the underside or the upper side of the cover plate, respectively. When the sample chamber is installed, bearing area 2a-1 rests on bearing region 4a-2 of the bearing plate.

The system further comprises a sample hold-down device 11 which comprises a hold-down structure 11a, presently a two-part hold-down structure which consists of two webs 11a-1 and 11a-2. When installed, each of the webs presses onto one of the partial regions of the press-on area.

The web can respectively be configured to be continuous or comprise discontinuations. This is shown in simplified form in FIGS. 6b and 6c in a detail of a longitudinal section in the region of the web. A further alternative is shown in FIG. 6d, wherein the bearing region of the sample holder on each of the longitudinal sides comprises several separate partial regions, opposite each of which a partial section of the hold-down structure is arranged, wherein the press-on area and the bearing area of the cover plate are arranged therebetween.

A warped cover plate is shown in FIGS. 6e and 6f in cross section and is not held down by a sample holder. It is bent upwardly there, once at the center and once at the ends. If the sample hold-down device is configured such that it presses onto the press-on area along the long side, then the cover plate can be made to assume a planar shape, as shown in the other figures. Due to the press-on area of the bearing area of the sample chamber and, in the installed state, there also the bearing region of the bearing plate of the sample holder being disposed opposite one another, the situation shown in FIG. 6g is prevented in which the cover plate is bent by pressing action.

The reservoir in FIG. 6a is covered from above by way of example, wherein a cover 12 there rests above on the cover plate. Alternatively, the cover plate itself can be configured such that it covers the reservoir. The cover can therefore be formed integrally with the cover plate, in particular, be part of the upper side of the cover plate. Alternatively, no cover can be provided like in the preceding figures.

Figure 7A:
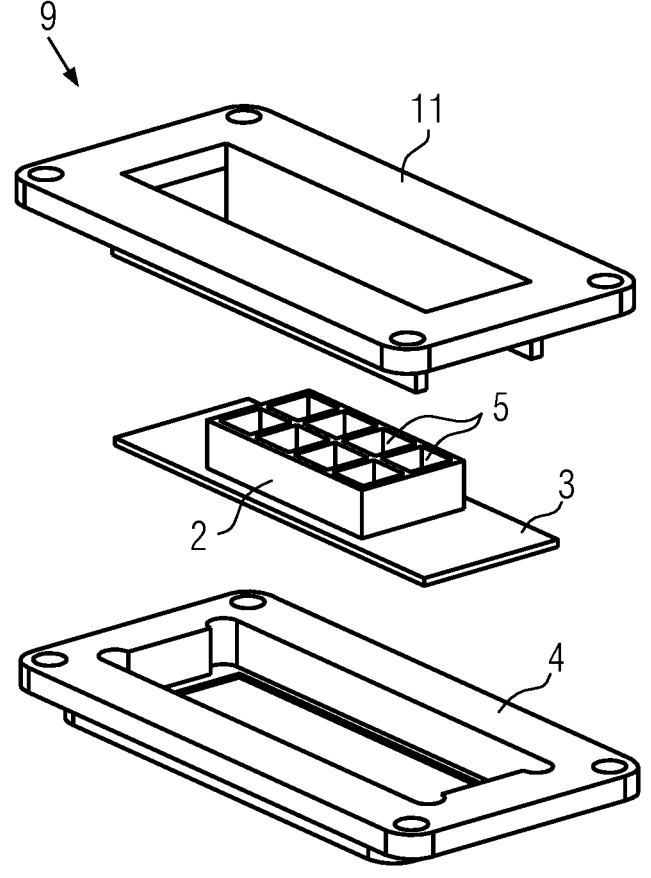
FIGS. 7a to 7c show schematic views at an angle, not true to scale, of an embodiment of the system with a sample chamber, a sample holder, and a sample hold-down device.
Figure 7B:
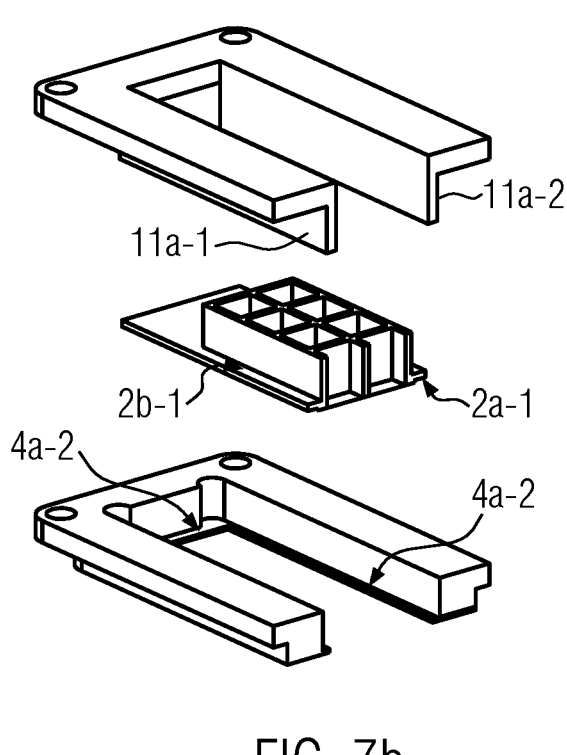
Figure 7C:
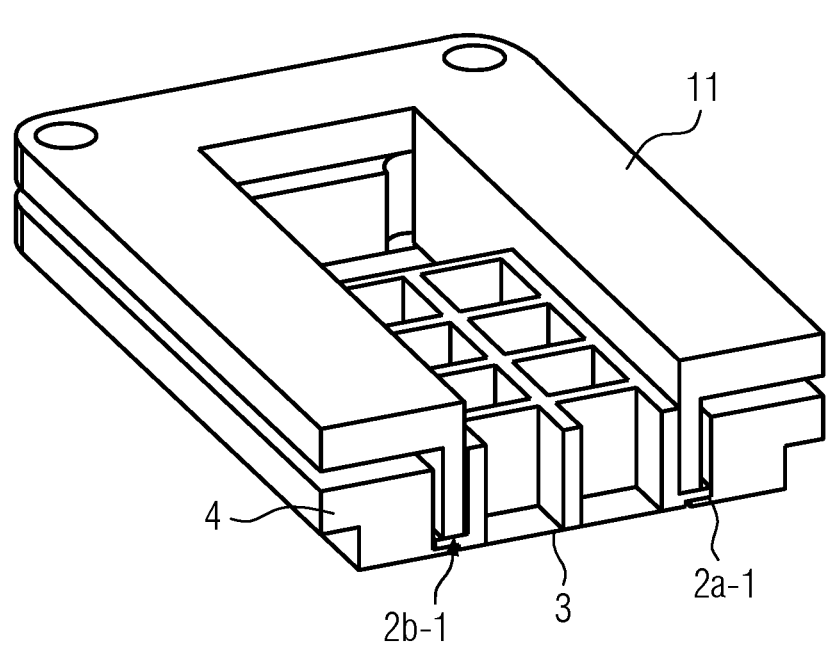

FIGS. 7a to 7c show an example of a system 9 according to the invention comprising a rectangular sample chamber 1 with several reservoirs 5, a press-on area 2b-1 arranged downwardly offset and circumferentially without discontinuations on the outer edge of the upper side of the cover plate, a bearing area 2a arranged circumferentially without discontinuations-1 on the outer edge of the underside [sic] cover plate, and a sample hold-down device 11 with two continuously formed webs 11a-1 and 11a-2, wherein each of the webs in the installed state presses onto one of the press-on areas along the longitudinal sides of the cover plate.

FIG. 7a shows the sample holder, the sample chamber, and the sample hold-down device in a view at an angle and before the sample chamber is inserted. For better illustration, only part of the system is shown in FIG. 7b so that the cross-sectional structure is also evident. The same part of the system is shown in FIG. 7c, wherein the sample chamber is inserted into the sample holder and the sample hold-down device is arranged on the sample chamber.

The respective web can alternatively (presently not shown) be configured with discontinuations in the longitudinal direction. The length of the discontinuations can be selected in accordance with the shape and properties of the sample chamber such that the sample chamber does not bend open.

Instead of a respective sample chamber which comprises a cover plate that is open towards the bottom in the region of the reservoirs and a base plate fastened thereto which forms the reservoir base, a sample chamber can be used in all of the embodiments shown in FIGS. 2 to 7, the cover plate of which is formed integrally, wherein the underside of the cover plate comprises a bearing area 2a-1 and a reservoir base area 2a-4, for example, as described in the context of FIG. 1m. In principle, the above explanations apply analogously to FIGS. 2 to 7, wherein the configuration and arrangement of the fastening area in this modification apply to the reservoir base area.

A few examples are used hereafter to illustrate how the sample chamber and/or the sample holder can be configured specifically.

In a specific example, the cover plate of the sample chamber is configured in the form of a rectangular microscopy carrier. The cover plate, also referred to as the upper part, is configured in the form of an injection-molded member and fastened to its underside is a base plate in the form of a cover glass.

The maximum length of the sample chamber, in particular, the length of its underside, is at most, in particular, less than 76 mm, and the maximum width of the sample chamber, in particular, the width of its underside is at most, in particular, less than 26 mm The cover glass thickness $D_D$ can be, for example, 0.17 mm. The underside of the cover plate comprises an opening which is covered by the base plate. Fastened to the underside of the cover plate in a centered manner is the base plate in the form of a rectangular cover glass having a length of 73 mm long and a width of 23 mm. The step structure of the underside of the cover plate comprises a step having a width of 2 mm which forms a circumferential outer edge of the underside of the cover plate.

In this example, the height of the step $H_U$=0.5 mm–$D_D$=0.5 mm–0.17 mm=0.33 mm. This means that the fastening area to which the cover plate is fastened is offset downwardly by 0.33 mm compared to the bearing area. The size of $H_U$=0.5 mm–$D_D$ is advantageous if the bearing plate of a sample holder has a thickness of 0.5 mm in the bearing region. The underside of the base plate then aligns with the underside of the bearing plate. In this view, it is assumed that joining the injection-molded member and the cover glass does not affect the overall thickness, i.e. that the sum of the thickness of the cover glass and the thickness of the injection-molded member is individually equal to the thickness of the joined structure composed of the cover glass and the injection-molded member. For example, this can be achieved by way of a welding technique that does not add any spacing between the cover glass and the injection-molded member.

Alternatively, double-sided adhesive tape can be used to apply the cover glass. The adhesive tape, for example, can have a mounted thickness of $D_K$=0.15 mm The step height can then be $H_U$=0.5 mm–$D_D$–$D_K$=0.5 mm–0.17 mm–0.15 mm=0.18 mm. The size of $H_U$=0.5 mm–$D_D$–$D_K$ is advantageous if the bearing plate of a sample holder has a thickness of 0.5 mm in the bearing region. The underside of the base plate then aligns with the underside of the bearing plate.

As a further example, the sample chamber can be configured in the form of a Petri dish with a maximum external diameter of 35 mm. The cover plate, i.e. the upper part of the Petri dish, is a circular rotationally symmetrical injection-molded member. The underside of the cover plate has a circular opening with a diameter of 21 mm which is covered with a circular base plate in the form of a cover glass having a thickness of 170 μm. The base plate is fastened to the cover plate using, for example, double-sided adhesive film having a thickness between 10 μm and 100 μm, in particular, a thickness of 50 μm. The underside of the cover glass is plane-parallel to the underside of the horizontal base region of the cover plate.

The underside of the cover plate in the region of the fastening area has a thickness of 1 mm and at the height of the fastening area a diameter of 31 mm. In the region of the bearing area, the cover plate has a thickness of 0.5 mm. The bearing area is offset upwardly by 0.5 mm with respect to the fastening area and the bearing area forms a 2 mm wide outer edge of the underside of the cover plate.

An exemplary system can comprise such a Petri dish and a sample holder, for example, made of an aluminum-magnesium alloy, the bearing plate of which has a vertical cylindrical recess with a diameter of 36 mm on the upper side. The recess ends 0.5 mm above the underside of the bearing plate so that the bearing plate has a thickness of 0.5 mm in this section. The recess is configured such that the bearing plate comprises a bearing region in the form of an even surface arranged parallel to the underside of the bearing plate. A microscopy opening in the form of a likewise cylindrical breakthrough having a diameter of 32 mm is arranged in the section of the bearing plate having a thickness of 0.5 mm, wherein the opening and the recess are arranged, in particular, concentrically.

If the above-described sample chamber in the form of a Petri dish is placed in this sample holder, then the underside of the cover glass and the underside of the bearing plate are in one plane, i.e. they align.

In a further example, the sample holder can have the lateral external dimensions of a multititer plate, i.e. for example 128 mm×86 mm, and can comprise several, for example, six, cylindrical recesses having an internal diameter of 36 mm. A cylindrical microscopy opening having a diameter of 35 mm can be formed in each of the recesses, wherein the bearing plate below the bearing region has a thickness of 0.5 mm, similar to the example described above.

It goes without saying that the features described above or shown in the figures are not restricted to these specific combinations.

Figure 8:
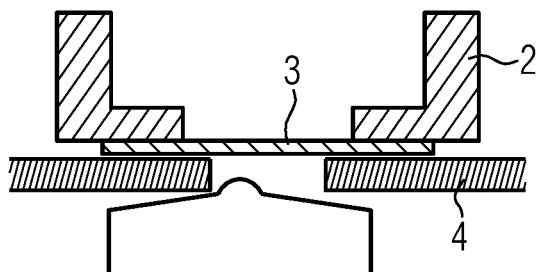
FIG. 8 shows a schematic side view, not true to scale, onto part of a system known from prior art.

For a better understanding, FIG. 8 shows a schematic cross-sectional view, not true to scale, of part of a system known from prior art. The sample holder is shown there on which the base plate, for example, a cover glass base, is fastened to the underside of a cover plate. As can be seen there, the underside of the base plate is arranged above the microscopy opening. FIG. 8 illustrates the above-described risk of collision between the objective and the sample holder and the accessibility decreasing towards the edges of the sample chamber.

What is claimed is:

1. A sample chamber for microscoping cells, comprising:
   a cover plate, an underside of which comprises a bearing area that extends along a face of the cover plate, wherein:
   a) a reservoir for said cells with a reservoir base is formed in said cover plate and wherein said underside of said cover plate comprises a reservoir base area which is arranged inwardly and offset downwardly with respect to said bearing area, wherein said bearing area is arranged between said reservoir base area and an outer edge of said underside of said cover plate, and wherein the bearing area is configured to rest on a sample holder, or
   b) said sample chamber comprises a base plate, wherein said cover plate and said base plate are configured and arranged such that they together form a reservoir for said cells with a reservoir base, wherein said base plate forms said reservoir base, wherein said underside of said cover plate comprises a fastening area which is arranged inwardly and offset downwardly with respect to said bearing area and on which said base plate is fastened, wherein said bearing area is arranged between said fastening area and an outer edge of said underside of said cover plate, and wherein the bearing area is configured to rest on a sample holder;

wherein the underside of the cover plate comprises a step structure formed by a) the bearing area and the reservoir base area or b) the bearing area and the fastening area;

wherein a distance by which the fastening area or the reservoir base area, respectively, are offset downwardly with respect to the bearing area is between 0.2 mm and 5 mm; and wherein the base plate or the cover plate, respectively, is made of COC, COP, PMMA, PS, PC or glass in a region of the reservoir base area; and wherein said bearing area comprises several partial areas separated from one another by separating elements, wherein said separating elements are each configured in the form of a standing element which extends downwardly from said bearing area, or in the form of a discontinuation.

2. The sample chamber according to claim 1,
wherein said bearing area forms at least part of said outer edge of said underside of said cover plate.

3. The sample chamber according to claim 2,
wherein said bearing area is arranged in a first plane, which is arranged horizontally during intended use, and said reservoir base area or said fastening area is arranged in a second plane, which is arranged horizontally during intended use and wherein said underside of said cover plate between said bearing area and said reservoir base area or between said bearing area and said fastening area comprises an area which is arranged in a third plane which is arranged horizontally during intended use and which is offset upwardly with respect to said bearing area.

4. The sample chamber according to claim 1,
wherein said bearing area is configured in the form of an area that is arranged circumferentially around said fastening area or around said reservoir base area and is subdivided by at least two separating elements in the form of discontinuations or in the form of standing elements into said separated partial areas.

5. The sample chamber according to claim 1, wherein the several partial areas comprise a first partial area and a second partial area which are separate from one another and arranged on oppositely disposed sides of said underside of said cover plate.

6. The sample chamber according to claim 5, wherein the several partial areas further comprise at least one of a third partial area or a fourth partial area which is arranged to be separate from said first partial area and said second partial area.

7. The sample chamber according to claim 1, wherein the several partial areas are evenly spaced along an outer side of said underside of said cover plate.

8. The sample chamber according to claim 1, wherein said cover plate comprises at least two standing elements which extend downwardly from said bearing area, wherein said standing elements each comprise a standing area which is arranged offset downwardly with respect to said bearing area.

9. The sample chamber according to claim 8, wherein said standing elements are arranged spaced from said fastening area or said reservoir base area, respectively.

10. A sample chamber for microscoping cells, comprising:
a cover plate, an underside of which comprises a bearing area that extends along a face of the cover plate, wherein:

a) a reservoir for said cells with a reservoir base is formed in said cover plate and wherein said underside of said cover plate comprises a reservoir base area which is arranged inwardly and offset downwardly with respect to said bearing area, wherein said bearing area is arranged between said reservoir base area and an outer edge of said underside of said cover plate, and wherein the bearing area is configured to rest on a sample holder, or b) said sample chamber comprises a base plate, wherein said cover plate and said base plate are configured and arranged such that they together form a reservoir for said cells with a reservoir base, wherein said base plate forms said reservoir base, wherein said underside of said cover plate comprises a fastening area which is arranged inwardly and offset downwardly with respect to said bearing area and on which said base plate is fastened, wherein said bearing area is arranged between said fastening area and an outer edge of said underside of said cover plate, and wherein the bearing area is configured to rest on a sample holder;

wherein the underside of the cover plate comprises a step structure formed by a) the bearing area and the reservoir base area or b) the bearing area and the fastening area;

wherein a distance by which the fastening area or the reservoir base area, respectively, are offset downwardly with respect to the bearing area is between 0.2 mm and 5 mm;

wherein the base plate or the cover plate, respectively, is made of COC, COP, PMMA, PS, PC or glass in a region of the reservoir base area, and wherein an upper side of said cover plate comprises a press-on area that is disposed entirely or in part opposite to said bearing area, wherein a thickness of said cover plate in a region of said press-on area is smaller than a maximum thickness of said cover plate so that said upper side of said cover plate has a step structure, wherein said press-on area forms at least a part of said outer edge of said upper side of said cover plate.

11. The sample chamber according to claim 10, wherein said press-on area is configured in the form of a continuous area or wherein said press-on area comprises several partial areas which are separate from one another, wherein said press-on area is configured in the form of an area which is arranged circumferentially around said upper side of said cover plate and which is subdivided into said separate partial areas by at least two discontinuations.

12. The sample chamber according to claim 10, wherein said press-on area comprises a first partial area and a second partial area which are separate from one another and arranged on oppositely disposed sides of said upper side of said cover plate.

13. The sample chamber according to claim 12, wherein said press-on area comprises at least one of a third partial area or a fourth partial area which is arranged to be separate from said first partial area and said second partial area.

14. The sample chamber according to claim 10, wherein said press-on area consists of a plurality of partial areas which are separate from one another and arranged evenly spaced along an outer side of said upper side of said cover plate.

15. A system comprising:

a sample holder which comprises a bearing plate with a microscopy opening, and a sample chamber for microscoping cells, wherein said sample chamber comprises a cover plate, an underside of which comprises a bearing area that extends along a face of the cover plate, wherein:

a) a reservoir for said cells with a reservoir base is formed in said cover plate and wherein said underside of said cover plate comprises a reservoir base area, wherein said sample chamber and said sample holder are configured such that, when said sample chamber is arranged as intended on said sample holder, said reservoir base area is arranged inwardly and offset downwardly with respect to said underside of said bearing plate or said reservoir base area is received in said microscopy opening, wherein said bearing area is arranged between said reservoir base area and an outer edge of said underside of said cover plate, and wherein the bearing area is configured to rest on the sample holder, or b) said sample chamber comprises a base plate, wherein said cover plate and said base plate are configured and arranged such that they together form a reservoir for said cells with a reservoir base, wherein said base plate forms said reservoir base and wherein said underside of said cover plate comprises a fastening area on which said base plate is fastened, wherein said sample chamber and said sample holder are configured such that, when said sample chamber is arranged as intended on said sample holder, said underside of said base plate is arranged inwardly and offset downwardly with respect to said underside of said bearing plate or said base plate is received in said microscopy opening, wherein said bearing area is arranged between said fastening area and an outer edge of said underside of said cover plate, and wherein the bearing area is configured to rest on the sample holder;

wherein the underside of the cover plate comprises a step structure formed by a) the bearing area and the reservoir base area or b) the bearing area and the fastening area;

wherein a distance by which the fastening area or the reservoir base area, respectively, are offset downwardly with respect to the bearing area is between 0.2 mm and 5 mm;

wherein the base plate or the cover plate, respectively, is made of COC, COP, PMMA, PS, PC or glass in a region of the reservoir base area, and wherein an upper side of said bearing plate comprises a bearing region comprising several partial areas separated from one another by discontinuations.

16. The system according to claim 15, wherein the bearing region is arranged offset downwardly with respect to other regions of said upper side of said bearing plate and on which said sample chamber rests when said sample chamber is arranged as intended on said sample holder so that said upper side of said bearing plate has a step structure, wherein said bearing region forms at least part of an inner edge of said upper side of said bearing plate.

17. The system according to claim 16, wherein said cover plate comprises at least two standing elements which extend downwardly from said bearing area, wherein said standing elements each comprise a standing area which is arranged offset downwardly with respect to said bearing area, and wherein said bearing region comprises openings or discontinuations which are configured and arranged such that said standing elements are received in said openings or discontinuations when said sample chamber rests on said sample holder as intended.

* * * * *